United States Patent
Ahn et al.

(10) Patent No.: US 7,724,628 B2
(45) Date of Patent: *May 25, 2010

(54) METHOD AND APPARATUS FOR RECORDING DATA ON OPTICAL RECORDING MEDIUM

(75) Inventors: Yong-jin Ahn, Seoul (KR); In-sik Park, Gyeonggi-do (KR); Kyung-geun Lee, Gyeonggi-do (KR); Chang-jin Yang, Gyeonggi-do (KR); Tatsuhiro Otsuka, Gyeonggi-do (KR); Seong-sue Kim, Seoul (KR); Jung-wan Ko, Gyeonggi-do (KR); Du-seop Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/933,026

(22) Filed: Oct. 31, 2007

(65) Prior Publication Data

US 2008/0123489 A1 May 29, 2008

Related U.S. Application Data

(63) Continuation of application No. 10/860,570, filed on Jun. 4, 2004, now Pat. No. 7,342,860, which is a continuation of application No. 10/372,675, filed on Feb. 25, 2003, now Pat. No. 7,376,064.

(60) Provisional application No. 60/373,378, filed on Apr. 18, 2002.

Foreign Application Priority Data

Feb. 25, 2002  (KR) .................................. 2002-9999

(51) Int. Cl.
    *G11B 7/00* (2006.01)
(52) U.S. Cl. .................................. 369/59.11; 369/47.5
(58) Field of Classification Search .............. 369/59.11, 369/47.5
    See application file for complete search history.

(56) References Cited

U.S. PATENT DOCUMENTS 5,109,373 A * 4/1992 Ohno et al. .................. 369/100

(Continued)

FOREIGN PATENT DOCUMENTS

EP          0 803 866          10/1997

(Continued)

OTHER PUBLICATIONS

Furumiya et al., "Optical Disk Recording System of 25GB Capacity", Optical Data Storage 2001, Santa Fe, NM, Apr. 22, 2001, *Proceedings of SPIE*, vol. 4342, Jan. 2002, pp. 186-193.

(Continued)

*Primary Examiner*—Wayne Young
*Assistant Examiner*—Van N Chow
(74) *Attorney, Agent, or Firm*—NSIP Law

(57) ABSTRACT

A method and apparatus to record data on an optical recording medium include generating a recording waveform having an erase pattern comprising a predetermined pulse having a high level which is higher than an erase power level and having a low level which is lower than the erase power level.

4 Claims, 25 Drawing Sheets

U.S. PATENT DOCUMENTS

| | | | |
|---|---|---|---|
| 5,144,601 | A | 9/1992 | Maeda et al. |
| 5,291,470 | A | 3/1994 | Nishiuchi et al. |
| 5,469,422 | A | 11/1995 | Sohmuta |
| 5,608,710 | A | 3/1997 | Minemura et al. |
| 5,872,763 | A | 2/1999 | Osakabe |
| 6,104,685 | A | 8/2000 | Saga et al. |
| 6,236,635 | B1 | 5/2001 | Miyamoto et al. |
| 6,281,815 | B1 | 8/2001 | Shim et al. |
| 6,359,846 | B1 | 3/2002 | Shoji et al. |
| 6,396,792 | B1 | 5/2002 | Ichihara |
| 6,421,314 | B1 | 7/2002 | Maruyama |
| 6,529,467 | B2 | 3/2003 | Miyamoto et al. |
| 6,574,178 | B2 | 6/2003 | Tieke et al. |
| 6,600,709 | B2 | 7/2003 | Dekker |
| 6,678,228 | B1 | 1/2004 | Kando et al. |
| 6,751,513 | B1 | 6/2004 | Spruit |
| 6,762,985 | B2 | 7/2004 | Furukawa et al. |
| 6,771,577 | B2 | 8/2004 | Yokoi |
| 6,781,936 | B1 | 8/2004 | Tieke et al. |
| 6,801,240 | B2 | 10/2004 | Abe et al. |
| 6,934,235 | B2 | 8/2005 | Seo |
| 7,009,923 | B2 * | 3/2006 | Kando et al. ............. 369/47.51 |
| 7,289,412 | B2 * | 10/2007 | Seo ........................ 369/59.11 |
| 2002/0003762 | A1 | 1/2002 | Dekker |
| 2003/0142606 | A1 * | 7/2003 | Ogawa et al. ............ 369/59.11 |
| 2003/0214892 | A1 | 11/2003 | Lee et al. |
| 2003/0218954 | A1 | 11/2003 | Ahn et al. |
| 2005/0073930 | A1 | 4/2005 | Lee et al. |
| 2005/0259555 | A1 | 11/2005 | Miyamoto et al. |

FOREIGN PATENT DOCUMENTS

| | | |
|---|---|---|
| EP | 0 298 650 | 4/2003 |
| JP | 1-253828 | 10/1989 |
| JP | 3-185628 | 8/1991 |
| JP | 6-215375 | 8/1994 |
| JP | 7-130098 | 5/1995 |
| JP | 7-240026 | 9/1995 |
| JP | 8-235587 | 9/1996 |
| JP | 9-231571 | 9/1997 |
| JP | 10-64064 | 3/1998 |
| JP | 10-241164 | 9/1998 |
| JP | 11-86291 | 3/1999 |
| JP | 2000-123367 | 4/2000 |
| JP | 2000-137916 | 5/2000 |
| JP | 2000-149262 | 5/2000 |
| JP | 2000-149302 | 5/2000 |
| JP | 2000-222733 | 8/2000 |
| JP | 2002-25060 | 1/2002 |
| WO | WO 01/86642 | 11/2001 |

OTHER PUBLICATIONS

Singapore Office Action issued on Oct. 13, 2004, in Singapore Patent Application No. 200206662-9 incorporating Search Report and Written Opinion issued on Jul. 6, 2004, by the Australian Patent Office acting as Searching and Examining Authority for the Intellectual Property Office of Singapore (Search Report and Written Opinion only) (in English).

Japanese Office Action issued on Nov. 1, 2005, in Japanese Patent Application No. 2002-374422 (in Japanese, no English translation).

Japanese Office Action issued on Nov. 1, 2005, in Japanese Patent Application No. 2004-180048 (in Japanese, no English translation).

Canadian Office Action issued on Oct. 20, 2006, in Canadian Patent Application No. 2,414,172 (first page only).

European Search Report issued on Nov. 27, 2006, in European Patent Application No. 02258466.8.

Malaysian Search Report and Examination Report issued on Jan. 16, 2007, in Malaysian Patent Application No. PI 20024162 (incorporates by reference European Search Report issued on Nov. 27, 2006, in European Patent Application No. 02258466.8) (in English).

U.S. Appl. No. 10/372,675, filed Feb. 25, 2003, Yong-jin Ahn et al., Samsung Electronics Co., Ltd.

U.S. Appl. No. 10/860,570, filed Jun. 4, 2004, Yong-jin Ahn et al., Samsung Electronics Co., Ltd.

U.S. Appl. No. 11/430,165, filed May 9, 2006, Yong-jin Ahn et al., Samsung Electronics Co., Ltd.

Japanese Office Action issued on Feb. 24, 2009, in Japanese Patent Application No. 2006-195834 (2 pages, in Japanese, no English translation).

Canadian Office Action issued on Oct. 9, 2008, in Canadian Patent Application No. 2,414,172 (2 pages, in English).

Standard ECMA-274, "Data Interchange on 120 mm Optical Disk using +RW Format—Capacity: 3,0 Gbytes and 6,0 Gbytes," 2nd Editiion, Jun. 1999, complete document, ECMA, Geneva, Switzerland.

* cited by examiner

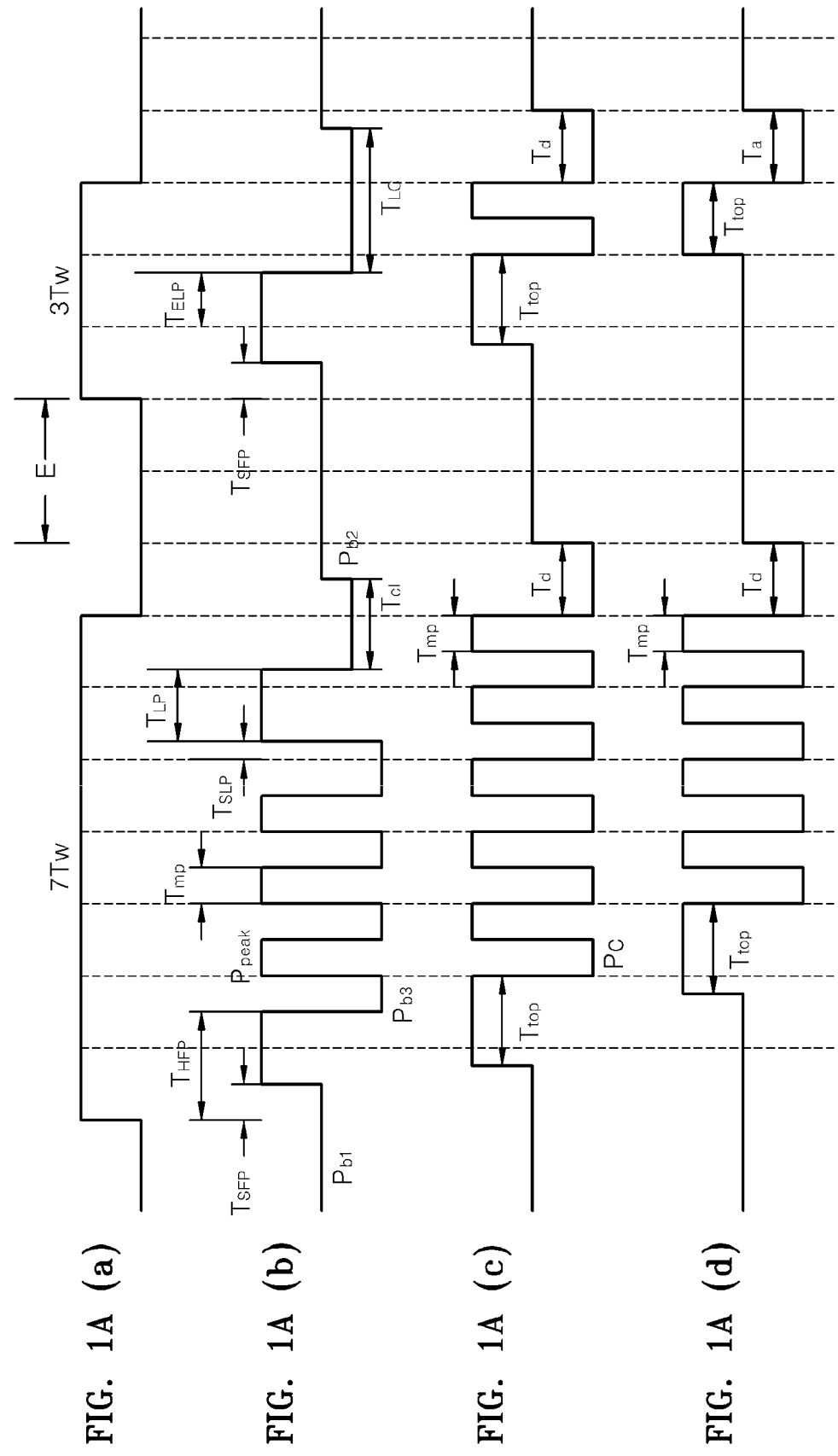

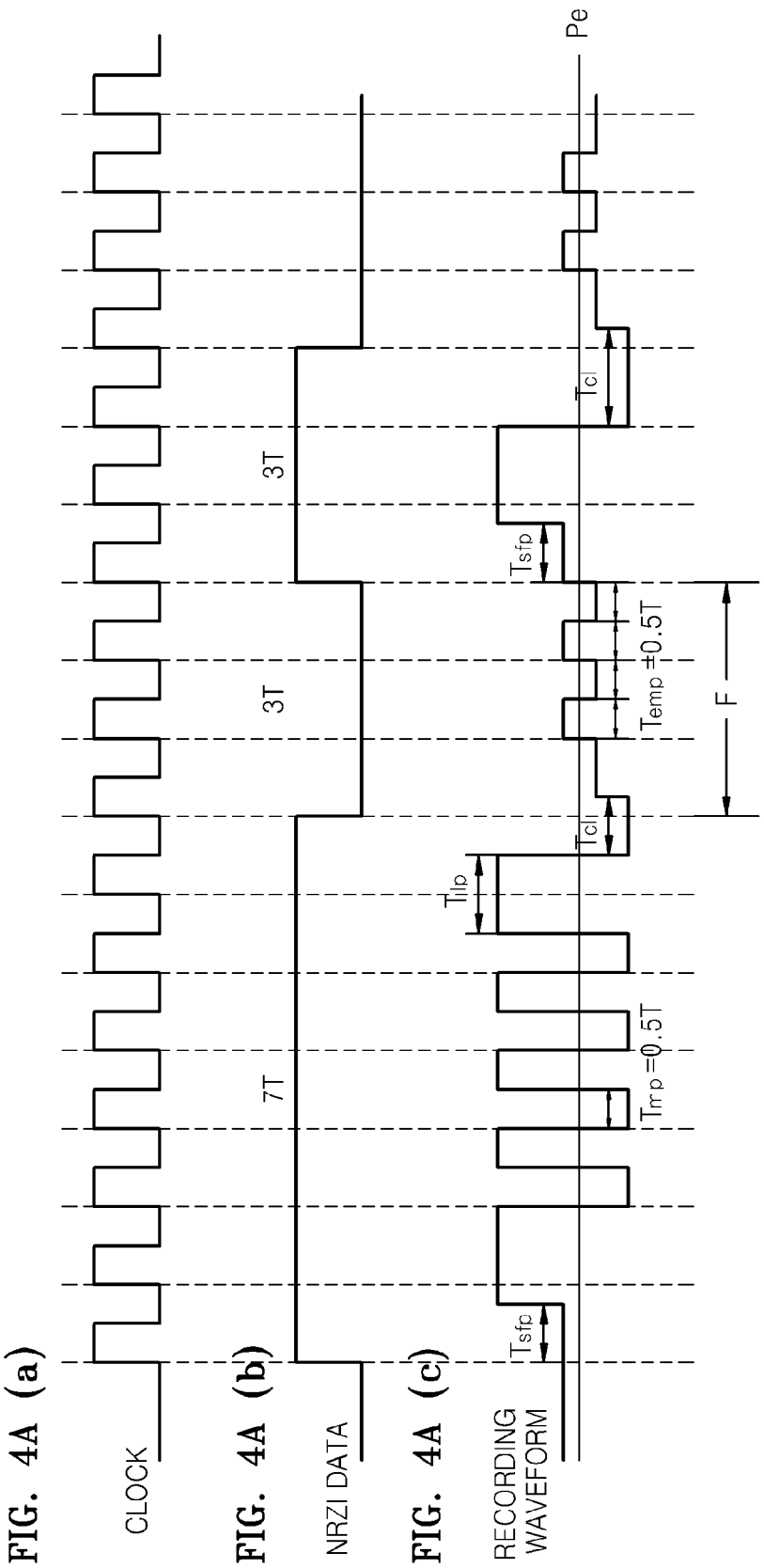

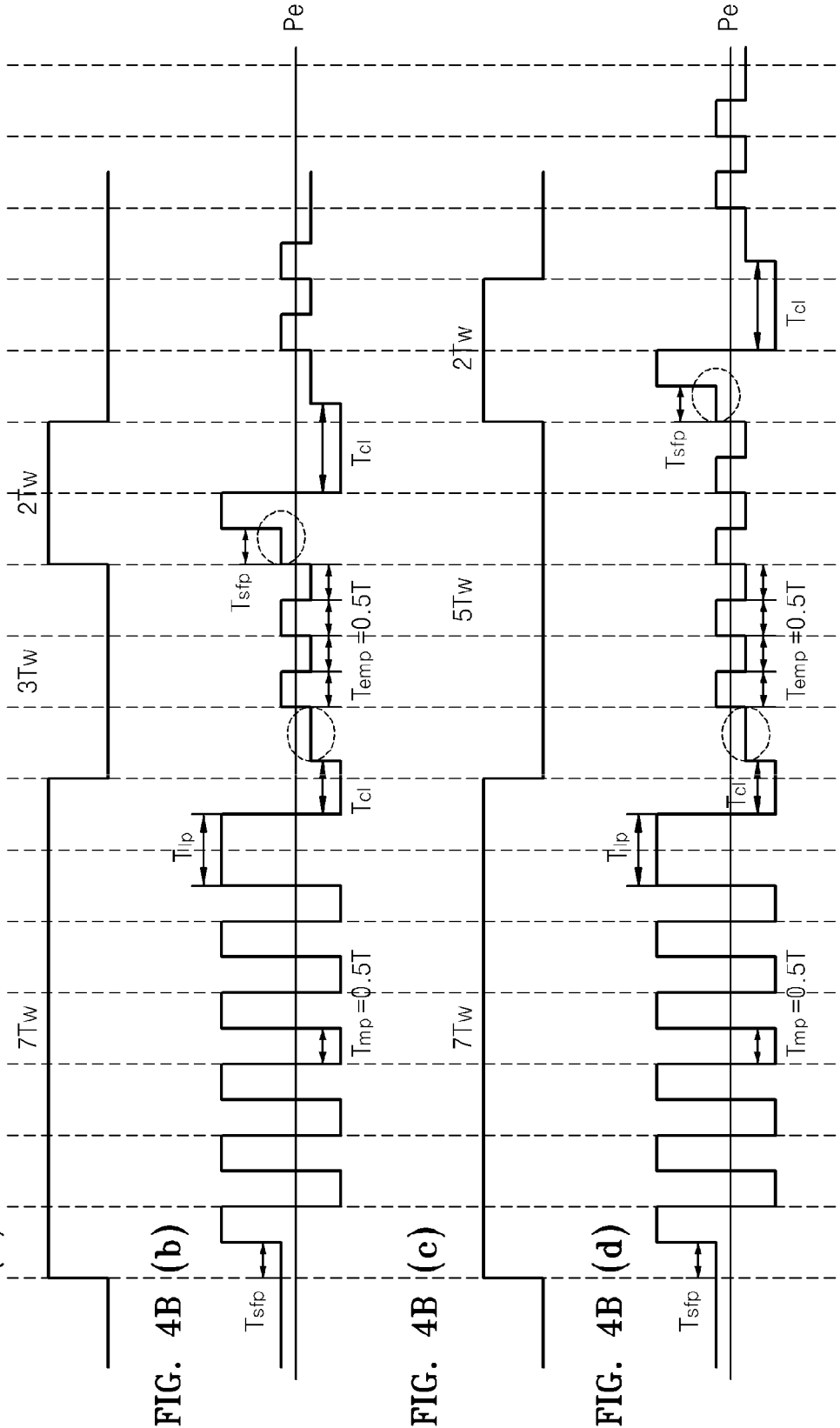

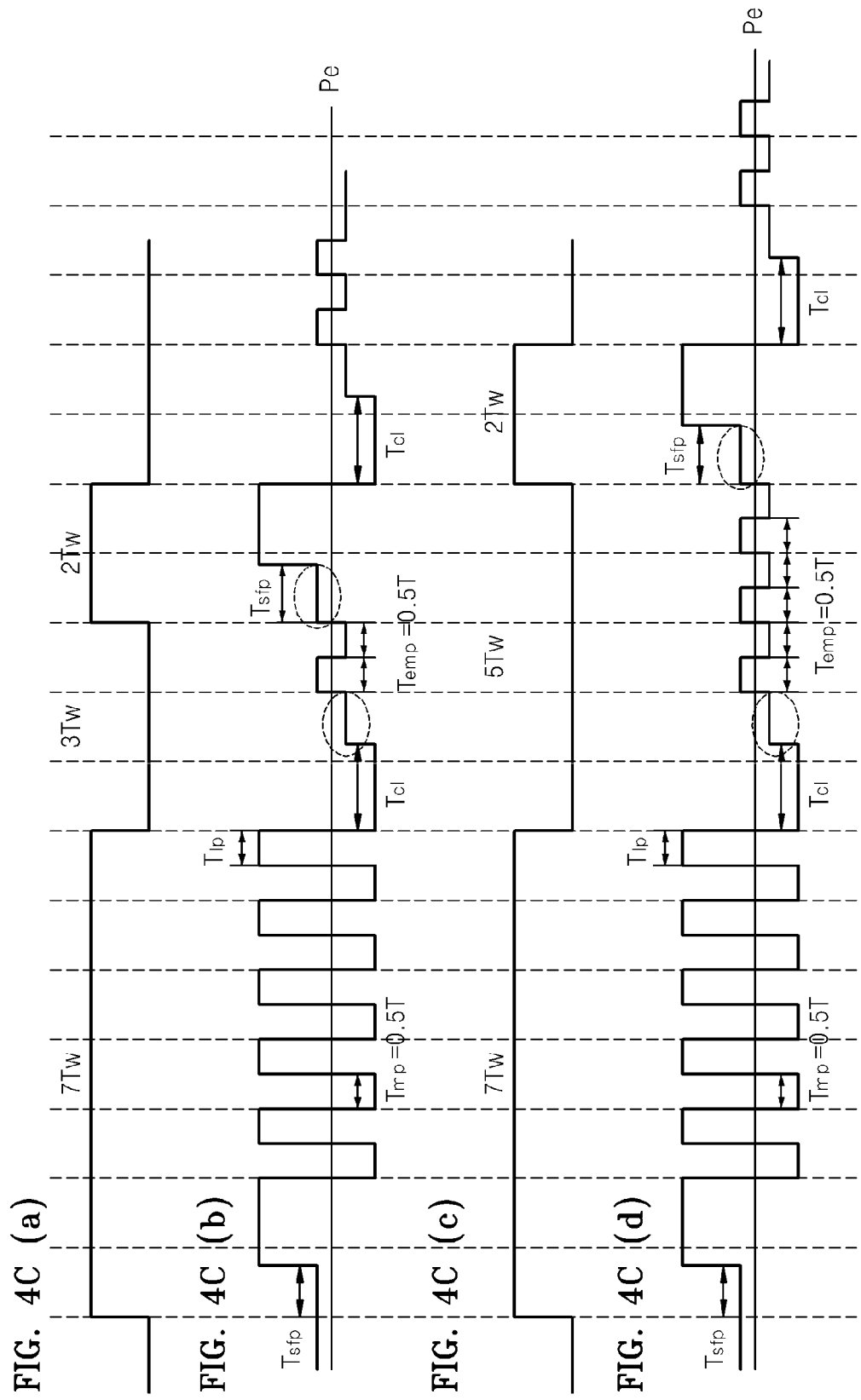

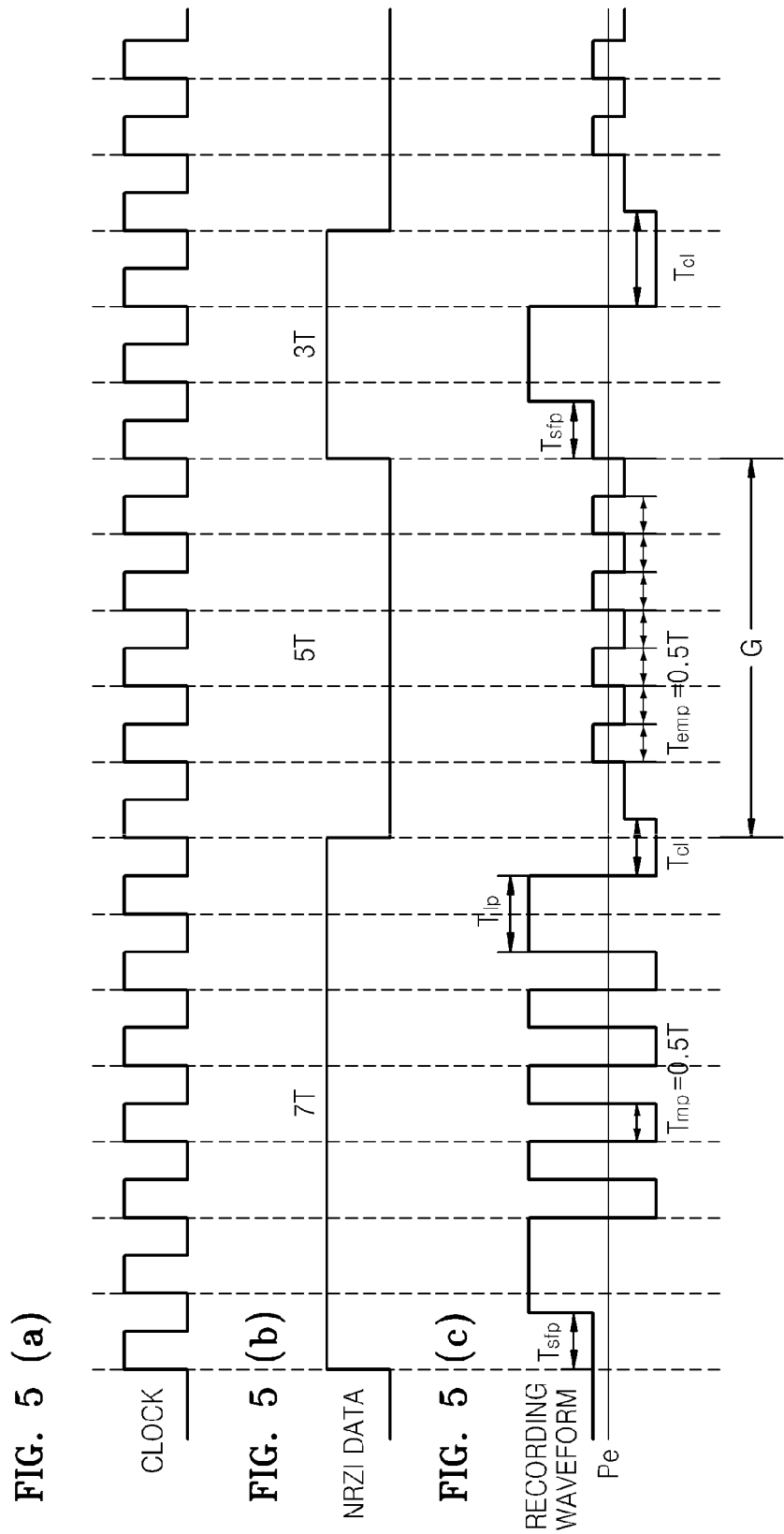

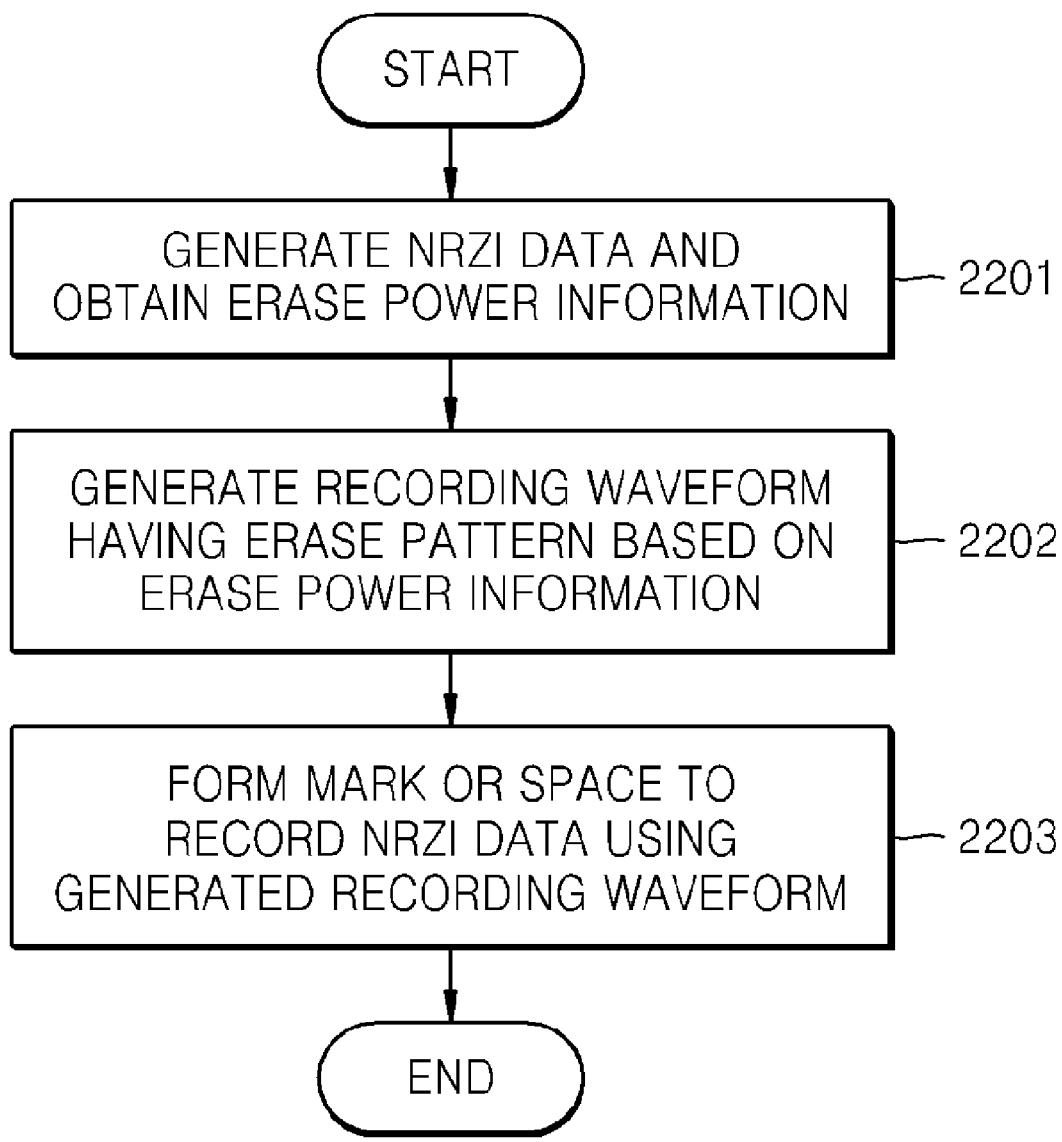

METHOD AND APPARATUS FOR RECORDING DATA ON OPTICAL RECORDING MEDIUM

CROSS-REFERENCE TO RELATED APPLICATIONS

This application is a continuation of application Ser. No. 10/860,570 filed on Jun. 4, 2004, now U.S. Pat. No. 7,342,860, which is a continuation of application Ser. No. 10/372,675 filed on Feb. 25, 2003, now U.S. Pat. No. 7,376,064, and claims the benefit of Provisional Application No. 60/373,378 filed on Apr. 18, 2002, now expired, and Korean Patent Application No. 2002-9999 filed on Feb. 25, 2002, in the Korean Intellectual Property Office. The disclosures of application Ser. No. 10/860,570, application Ser. No. 10/372,675, Provisional Application No. 60/373,378, and Korean Patent Application No. 2002-9999 are incorporated herein by reference in their entirety.

BACKGROUND OF THE INVENTION

1. Field of the Invention

The present invention relates to a method and apparatus to record data on an optical recording medium, and more particularly, to a method and apparatus to record digital data by forming a mark on an optical disc.

2. Description of the Related Art

When recording data on an optical recording medium such as an optical disc, a mark is formed on a track formed in the optical disc. The mark is formed as a pit of a read only disc such as a CD-ROM, a DVD-ROM and the like. The mark is formed on a recordable disc such as a CD-R/RW, a DVD-R/RW/RAM and the like when a phase change occurs in a phase change layer, which is changed to be crystalline or amorphous depending on a temperature and coats of the recording layer.

Data recording methods include a mark edge recording method and a mark position recording method in view of a signal detection. In the mark position recording method, an amplitude of a detected radio frequency (RF) signal is changed from positive/negative to negative/positive in a position where the mark is recorded. In the mark edge recording method, the amplitude of the detected RF signal is changed from positive/negative to negative/positive at edges of the mark. Thus, it is important to accurately record the edges of the mark to improve a quality of a reproduced signal.

However, by observing a trailing edge of the mark recorded on the disc coated with the phase change layer according to a conventional recording method, it can be seen that a shape of the mark depends on a length of the mark or a distance between marks, i.e., a length of a space. In other words, the trailing edge is wider than a leading edge of the mark, which degrades recording/reproducing characteristics. A relatively long length of the mark further degrades recording/reproducing characteristics due to thermal accumulation.

FIG. 1A(a) shows a waveform of Non Return to Zero Inverted (NRZI) data, and FIGS. 1A(b) through 1A(d) show recording waveforms according to the conventional recording method. Referring to FIGS. 1A(b) through 1A(d), there are shown various recording waveforms to record the NRZI data shown in FIG. 1A(a). A first recording waveform of FIG. 1A(b) is for a DVD-RAM. Recording waveforms FIG. 1A(c) and FIG. 1A(d) are for a DVD-RW. T represents a cycle of a reference clock signal. According to the mark edge recording method, a high level of the NRZI data is recorded using marks and a low level of the NRZI data is recorded using spaces. A recording waveform used to record the mark is called "a recording pattern," and the recording waveform used to form the space (erasing the mark) is called "an erase pattern." Conventional recording waveforms FIG. 1A(b), FIG. 1A(c), and FIG. 1A(d) are each made of multiple pulses. A power level of each pulse is controlled to have one of four levels: $P_{peak}$, $P_{b1}$, $P_{b2}$, and $P_{b3}$. As shown in section E, the power of the erase pattern is maintained to be a uniform predetermined DC level.

Because the erase pattern included in a conventional recording waveform is maintained at the uniform DC level for a predetermined time, heat of about 0-200° C. is continuously applied to a corresponding area. Thus, if the mark is recorded a plurality of times, the mark is degraded and the shape thereof is distorted. As a result, the recording/reproducing characteristics are remarkably degraded. In particular, the cycle T of the reference clock signal is reduced as a recording density and a linear velocity to record a large amount of data on a disc increases. As a result, the recording/reproducing characteristics are much more degraded when thermal interference between pulses constituting the recording waveform is increased.

FIGS. 1B and 1C show the shapes of marks formed on the optical recording medium. Referring to FIGS. 1B and 1C, a track of the optical recording medium includes a groove and a land. To record predetermined data on the optical recording medium, marks are formed on or erased from the groove and the land. However, a laser beam applies heat to the optical recording medium to form or erase the marks. The heat may cause a thermal crossing phenomenon in which adjacent tracks or adjacent marks are affected. FIG. 1B illustrates a method of recording the predetermined data by forming the marks on both the groove and the land where the thermal crossing phenomenon easily occurs. FIG. 1C illustrates a method of forming marks only on the groove, which is currently used for most optical recording media because the thermal crossing phenomenon hardly occurs. However, in the method shown in FIG. 1C, previously-formed marks may also be affected by applying too much heat when forming predetermined marks.

Different recording waveforms are used for different kinds of discs, i.e., DVD-RAM, DVD-RW, and the like because the characteristics of recording layers are different from each other. The use of different recording waveforms for different discs becomes a problem when manufacturing drives to record the data on different types of discs because drives that can read different types of discs should realize various recording waveforms, which increases costs.

SUMMARY OF THE INVENTION

In accordance with a first aspect of the present invention, there is provided a method and apparatus to record data using a recording waveform which is capable of preventing leading and trailing edges of a mark from being distorted and preventing degradation caused by repeated recording.

According to a second aspect of the present invention, there is provided a method and apparatus to record data using a recording waveform having an erase pattern which is capable of improving a shape of a mark.

According to the third aspect of the present invention, there is provided a method and apparatus to record data using a recording waveform which is adaptable to a disc having a recording layer of various characteristics.

According to a fourth aspect of the present invention there is provided a method and apparatus to generate erase pulses based on information about the power level of the erase pulses.

According to a fifth aspect of the present invention, there is provided a method and apparatus to control a power level of predetermined erase pulses to uniformly erase a recording mark.

Accordingly, to achieve the above aspects, there is provided a method of recording data on an optical recording medium. A recording waveform is generated having an erase pattern including a predetermined pulse having a high level which is higher than an erase power level and having a low level which is lower than the erase power level.

A mark and a space are recorded according to a run length limited scheme (2, 10). The mark may be recorded using a first level of a predetermined NRZI and the space is recorded using a second level of the predetermined NRZI data.

According to an aspect of the present invention, there is provided a method of recording data on a recording medium. Digital data where a channel is modulated is generated. A recording waveform is generated having an erase pattern including a predetermined pulse having a high level, which is higher than an erase power level and having a low level, which is lower than the erase power level. Marks are formed according to a first level data of the digital data and spaces are formed according to a second level data of the digital data using the generated recording waveform on level information.

When generating the digital data, the level information of an erase pulse recorded on the optical recording medium is read. Also, when generating the recording waveform, the erase pattern included in the generated recording waveform is formed by an erase pulse generated based on the level information. The level information of the erase pulse is input from a user.

The method is performed based on a (2, 10) run length limited scheme or a (1,7) run length limited scheme.

According to an aspect of the present invention, a power level of a first pulse of the erase pattern is the low level of the erase pattern and a power level of a last pulse of the erase pattern is the high level. According to an aspect of the present invention, the power level of the first pulse of the erase pattern is the high level of the erase pattern and the power level of the last pulse of the erase pattern is the high level. In the alternative, the power level of the first pulse of the erase pattern is the low level of the erase pattern and the power level of the last pulse of the erase pattern is the low level, or the power level of the first pulse of the erase pattern is the high level of the erase pattern and the power level of the last pulse of the erase pattern is the low level.

According to an aspect of the present invention, a ratio of a time for which a high level of a multi-pulse lasts to a time for which a low level of the multi-pulse lasts is 1:1, and a time for which the high level lasts is ½ of a clock cycle.

The mark is formed using a first level of a predetermined NRZI data and the space is formed using a second level of the predetermined NRZI data.

The recording waveform includes cooling pulses and the erase pattern includes a portion of the cooling pulses. If an ending point of the cooling pulse is smaller or greater than 0.5T from a trailing edge of the NRZI signal, a time for which the first pulse including the erase pattern lasts is increased to more than 0.5T.

According to an aspect of the present invention, a unit pulse including the erase pattern has a high level and a low level which are controlled according to a time for which the first pulse including the recording waveform lasts.

The recording pattern includes a multi-pulse. According to an aspect of the present invention, the recording pattern has at least two power levels.

To achieve the above and/or other aspects, there is provided an apparatus to record data on an optical recording medium. The apparatus includes a recording waveform generator and a pickup unit. The recording waveform generator generates a recording waveform having an erase pattern including a multi-pulse having at least one pulse where a high level is higher than an erase power level and a low level is lower than the erase power level. The pickup unit radiates a light onto the optical recording medium according to the generated recording waveform to form a mark or a space.

The apparatus may further include a power information management unit which reads pulse level information of the erase pattern recorded on the optical recording medium and provides the read pulse level information to the recording waveform generator. The recording waveform generator generates the recording waveform having the erase pattern including the multi-pulse based on the level information of the erase pattern. The power information management unit may receive the pulse level information of the erase pattern from a user and provide the pulse level information to the recording waveform generator.

According to an aspect of the present invention, the apparatus further includes a channel modulator which modulates a channel of data provided from an outside source to generate NRZI data and outputs the NRZI data to the recording waveform generator.

According to an aspect of the present invention, a pickup unit includes a motor, an optical head, a servo circuit, and a laser driver. The motor rotates the optical recording medium. The optical head radiates the light onto the optical recording medium or receives laser light reflected from the optical recording medium. The servo circuit servo-controls the motor and the optical head. The laser driver drives a laser installed on the optical head.

These together with other aspects and/or advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other aspects and/or advantages of the invention will become apparent and more readily appreciated from the following description of the embodiments, taken in conjunction with the accompanying drawings of which:

FIG. 1A(a) is a view of a waveform of Non Return to Zero Inverted (NRZI) data, and FIGS. 1A(b) through 1A(d) are views of recording waveforms according to a conventional method;

FIGS. 4A(a) through 4C(d) are examples of recording waveforms generated by a recording waveform generator;

FIGS. 5(a) through 5(c) are examples of a recording waveform generated by the recording waveform generator;

FIGS. 11(a) through 15 are graphs illustrating characteristics of a DVD-RAM;

FIGS. 16(a) through 20 are graphs illustrating characteristics of a DVD-RW;

FIGS. 22A and 22B are flowcharts illustrating recording methods, according to aspects of the present invention.

DETAILED DESCRIPTION OF THE INVENTION

Figure 1B:
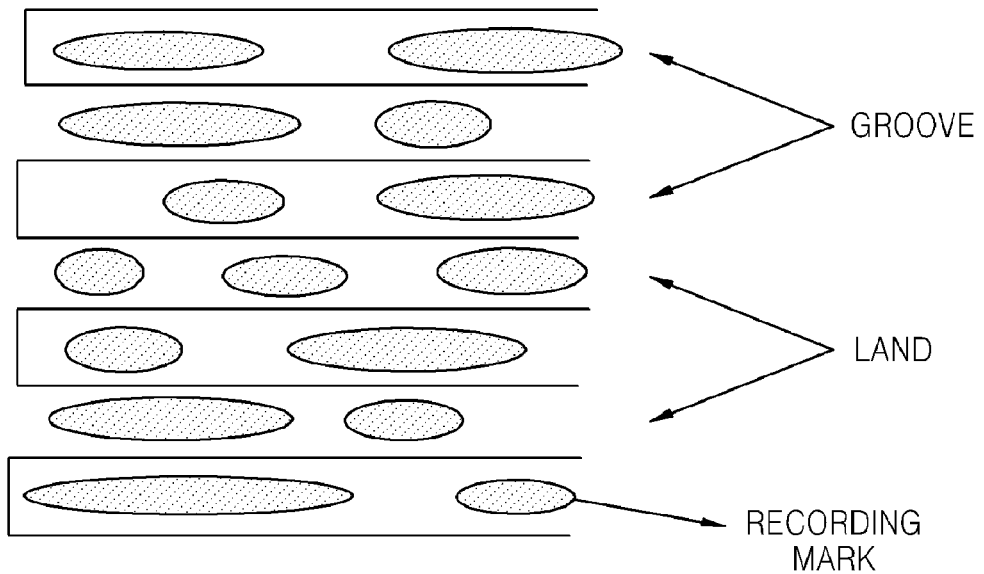
FIGS. 1B and 1C are views of shapes of marks formed on an optical recording medium.
Figure 1C:
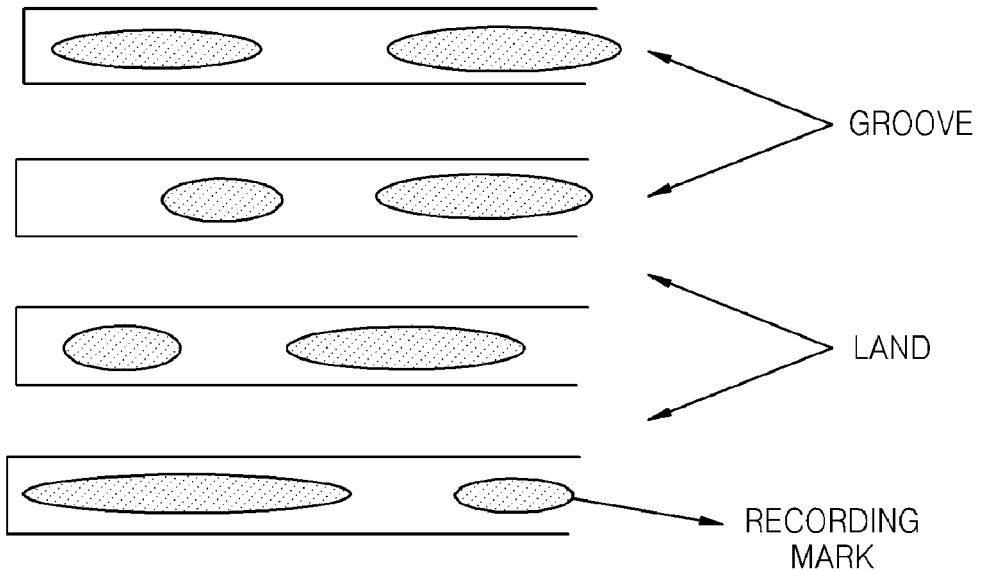

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2A:
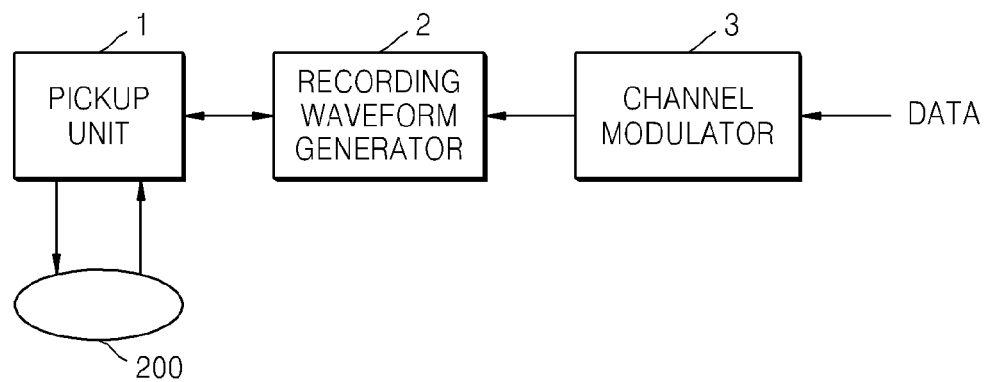
FIGS. 2A and 2B are block diagrams of recording apparatuses, according to aspects of the present invention.
Figure 2B:
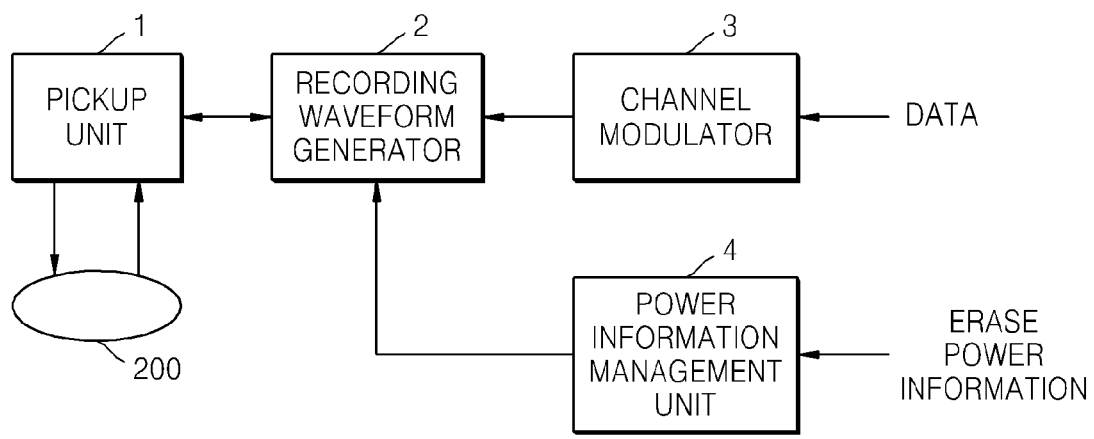

FIGS. 2A and 2B are block diagrams of recording apparatuses, according to aspects of the present invention. Referring to FIG. 2A, the recording apparatus, which forms a mark or a space to record data on an optical recording medium 200, includes a pickup unit 1, a recording waveform generator 2, and a channel modulator 3.

The channel modulator 3 modulates input data to a channel bit sequence. The recording waveform generator 2 is supplied with information about the channel bit sequence and erase powers $P_{b1}$ and $P_{b2}$ and generates a recording waveform to record the channel bit sequence. The generated recording waveform includes an erase pattern having erase multi-pulses. The recording waveform will be described in detail later. The pickup unit 1 radiates a light onto the optical recording medium 200 according to the generated recording waveform to form the mark or the space.

Referring to FIG. 2B, the recording apparatus, which forms the mark or the space to record the data on the optical recording medium 200, includes the pickup unit 1, the recording waveform generator 2, the channel modulator 3, and a power information management unit 4.

The channel modulator 3 modulates input data to the channel bit sequence. The power information management unit 4 reads information about the erase powers $P_{b1}$ and $P_{b2}$ from the optical recording medium 200 or receives the information from an outside source.

The recording waveform generator 2 is supplied with information about the channel bit sequence and the erase powers $P_{b1}$ and $P_{b2}$ and generates the recording waveform to record the channel bit sequence based on the information about the erase powers $P_{b1}$ and $P_{b2}$. The generated recording waveform includes the erase pattern having the erase multi-pulses. The recording waveform will be described in detail later. The pickup unit 1 radiates the light onto the optical recording medium 200 according to the generated recording waveform to form the mark or the space.

The power information management unit 4 first performs tests to record and to erase predetermined test data (random data or predetermined data) in a test area of the optical recording medium 200 at predetermined value intervals (e.g., a value of 3-4% of a level value) within a predetermined range (e.g., a range of ±20%) based on the information about the erase powers $P_{b1}$ and $P_{b2}$. Next, the power information management unit 4 selects optimum conditions among the test conditions (e.g., conditions in which a jitter value is minimum, a resolution is the highest, a degree of modulation is maximum, and the like) based on test results, and provides the optimum conditions to the recording waveform generator 2.

Figure 3A:
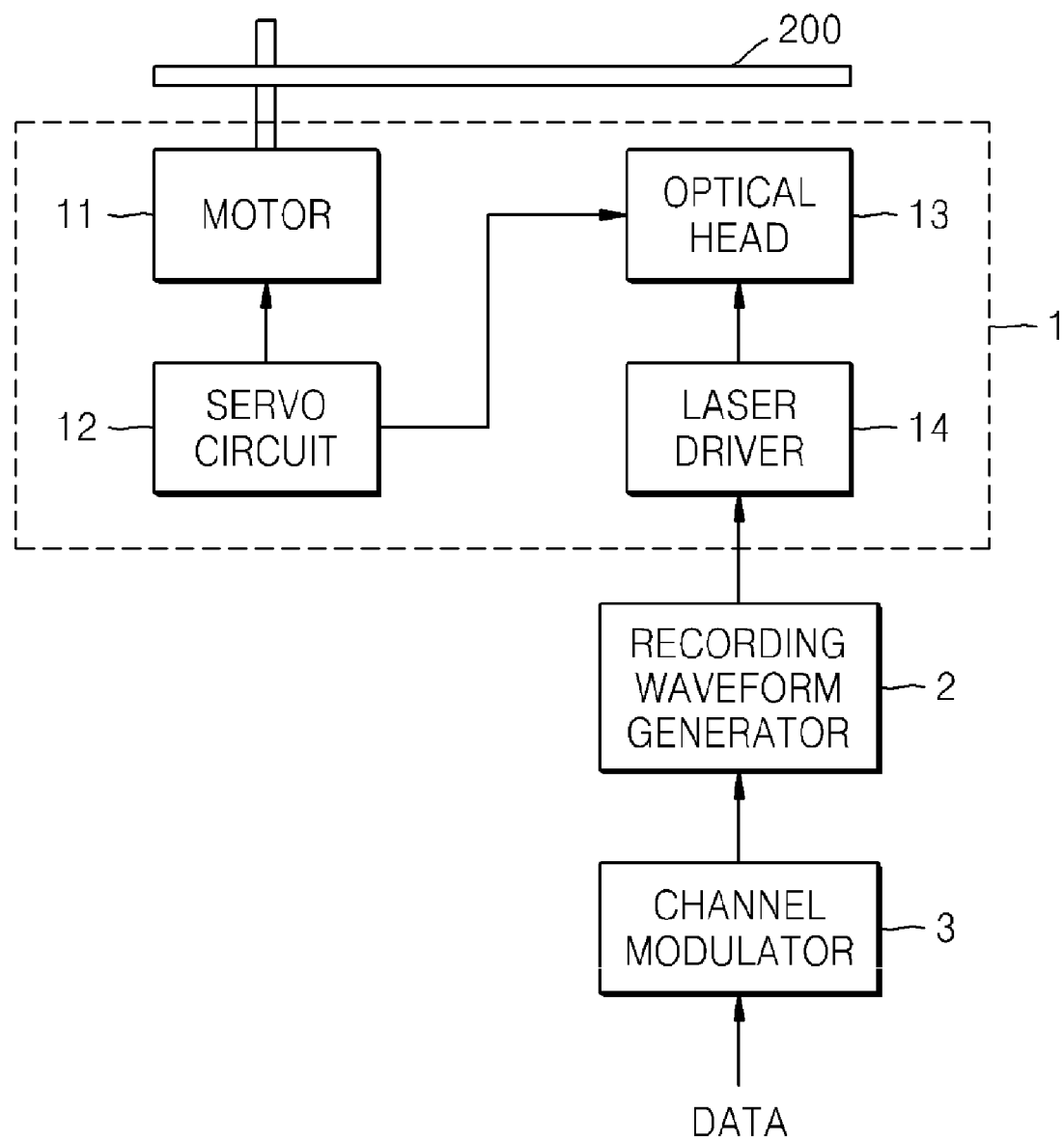
FIGS. 3A and 3B are examples realized by the recording apparatuses shown in FIGS. 2A and 2B.
Figure 3B:
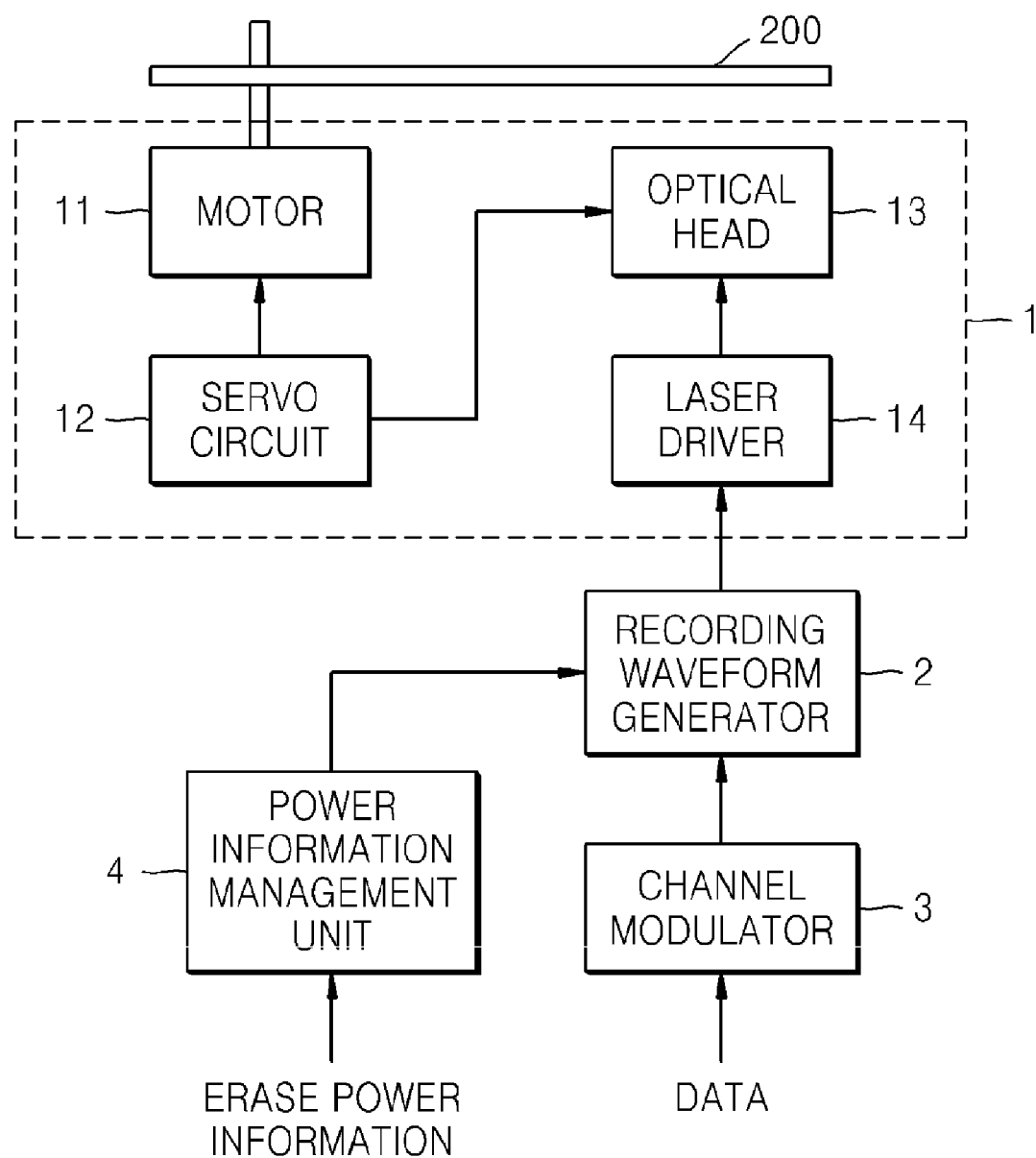

FIGS. 3A and 3B are examples realized by the recording apparatuses shown in FIGS. 2A and 2B, respectively. Elements that are the same as those in FIGS. 2A and 2B are described with the same numerals, and thus their detailed descriptions are omitted.

Referring to FIG. 3A, the recording apparatus includes the pickup unit 1, the recording waveform generator 2, and the channel modulator 3. The pickup unit 1 has a motor 11, a servo circuit 12, an optical head 13, and a laser driver 14. The motor 11 rotates the optical disc 200. The servo circuit 12 servo-controls the motor 11 and the optical head 13. The optical head 13 radiates a laser light onto the optical disc 200 and receives the laser light reflected from the optical disc 200. The laser driver 14 drives a laser (not shown) installed on the optical head 13.

The channel modulator 3 modulates the input data to the channel bit sequence and outputs Non Return to Zero Inverted (NRZI) data. The recording waveform generator 2 generates the recording waveform to record the NRZI data based on the information about the erase powers $P_{b1}$ and $P_{b2}$ and provides the recording waveform to the laser driver 14 in the pickup unit 1.

The laser driver 14 controls the laser using the received recording waveform to form the mark or the space on the optical recording medium 200.

Referring to FIG. 3B, the recording apparatus includes the pickup unit 1, the recording waveform generator 2, the channel modulator 3, and the power information management unit 4. The pickup unit 1 includes the motor 11, the servo circuit 12, the optical head 13, and the laser driver 14. The motor 11 rotates the optical recording medium 200. The servo circuit 12 servo-controls the motor 11 and the optical head 13. The optical head 13 radiates the laser light onto the optical disc 200 and receives the laser light reflected from the optical disc 200. The laser driver 14 drives the laser (not shown) installed on the optical head 13.

The channel modulator 3 modulates the input data to the channel bit sequence and outputs the NRZI data. The power information management unit 4 reads the information about the erase powers $P_{b1}$ and $P_{b2}$ recorded on the optical recording medium or receives the information from the outside source. The recording waveform generator 2 generates the recording waveform to record the NRZI data based on the information about the erase powers $P_{b1}$ and $P_{b2}$ and provides the recording waveform to the laser driver 14 in the pickup unit 1.

The laser driver 14 controls the laser using the received recording waveform to form the mark or the space on the optical disc 200.

FIGS. 4A(a) through 4C(d) are examples of recording waveforms generated by the recording waveform generator 2. In FIGS. 4A(a) and 4A(b), N−2 pulses are necessary to record the mark for arbitrary N periods of a reference clock signal of integers 2-14, and N−1 pulses are necessary to generate the space to erase an existing mark for the arbitrary N periods of the reference clock signal of 4A(a). In FIGS. 4B(a) through 4B(d), N−1 pulses are necessary to record the mark for arbitrary N periods T of the reference clock signal of integers 2-14, and N−1 pulses are necessary to generate the space to erase the existing mark for the arbitrary N periods of the reference clock signal so that an end position of a first one of the recording pulses corresponds to an end portion of a first clock pulse. In FIGS. 4C(a) through 4C(d), N−1 pulses are necessary to record the mark for arbitrary N periods T of the reference clock signal of integers 2-14, and N−2 pulses are necessary to generate a space to erase the existing mark for arbitrary N periods of the reference clock signal so that the end position of the first one of the recording pulses corresponds to the end portion of a second clock pulse and the last one of the recording pulses corresponds to the end portion of NRZI.

Referring to FIG. 4A(b), the NRZI data varies depending on a modulation method of the channel modulator 3. In other words, in a case where the NRZI data is modulated to Run Length Limited (RLL) (2, 10) data, i.e., a minimum length of the mark is 3T and a maximum length of the mark is 11T according to Eight to Fourteen Modulation (EFM), Eight to Fourteen Modulation Plus (EFM+), D(8-15), and Dual Modulation. Here, D(8-15) is a modulation method published in "Optical Disk Recording System of 25 GB Capacity" by S. Furumiya et al. in Optical Data Storage (ODS) 2001. Dual Modulation is disclosed in U.S. Pat. No. 6,281,815 to Shim et al. entitled "Method of Allocating RLL Code Having Enhanced DC Suppression Capability, Modulation Method, Demodulation Method, and Demodulation Apparatus Therefor" which is incorporated herein by reference. The minimum recording mark is 2T and the maximum recording mark is 8T when using RLL(1,7).

When forming a high level of the NRZI data with the mark and a low level with the space, the recording waveform includes the recording pattern to record the mark having a length of 7T, the erase pattern to form the space having a length of 3T, and the recording pattern to record the mark having a length of 3T.

The recording pattern includes a pulse sequence. The erase pattern also includes the pulse sequence as shown in section F. As shown in FIG. 4A(c), Tmp represents a width of the multi-pulses constituting the recording pattern. Here, the multi-pulses represent at least one pulse whose width and power strength are identical. According to an aspect of the present invention, Tmp is 0.5T. Tlp represents a width of the last pulse including the recording pattern. Tcl represents a time for which a cooling pulse lasts. The cooling pulse ranges over the recording pattern and the erase pattern. Temp represents a width of the erase multi-pulse constituting the erase pattern. According to an aspect of the present invention, Temp is 0.5T. Tsfp represents the time from a point when the NRZI data is switched from the low level to the high level to a point when the first pulse constituting the recording pattern starts. Tsfp affects the power level of the erase pattern. In other words, as shown in FIG. 4A(c), if Tsfp is greater than 0.5T, the multi-pulse included in the erase pattern is ended at the low level $P_{b1}$ and subsequent Tsfp starts at the high level $P_{b2}$ of the multi-pulse. In contrast, if Tsfp is smaller than 0.5T, the multi-pulse included in the erase pattern is ended at the low level $P_{b1}$ and subsequent Tsfp maintains the low level $P_{b1}$ of the multi-pulse.

Referring to FIGS. 4B(a) through 4B(d), two recording pattern examples are shown: when forming the high level of the NRZI data with the mark and the low level with the space, the recording waveform includes the recording pattern to record the mark having the length of 7T, the erase pattern to form the space having the length of 3T, and the recording pattern to record the mark having the length of 2T; and when forming the high level of the NRZI data with the mark and the low level with the space, the recording waveform includes the recording pattern to record the mark having a length of 7T, the erase pattern to form the space having a length of 5T, and the recording pattern to record the mark having a length of 2T. A number of pulses in a recording mark section is one more than the number of pulses shown in FIGS. 4A(a) through 4A(c).

Referring to FIGS. 4C(a) through 4C(c), two recording pattern examples are shown: when forming the high level of the NRZI data with the mark and the low level with the space, the recording waveform includes the recording pattern to record the mark having the length of 7T, the erase pattern to form the space having the length of 3T, and the recording pattern to record the mark having the length of 2T. When forming the high level of the NRZI data with the mark and the low level with the space, the recording waveform includes the recording pattern to record the mark having the length of 7T, the erase pattern to form the space having the length of 5T, and the recording pattern to record the mark having the length of 2T. The number of pulses is one more than the number of pulses shown in FIGS. 4A(a) through 4A(c) in the recording mark section, but one less than the number of pulses shown in FIGS. 4A(a) through 4A(c) in a space mark section.

FIGS. 5(a) through 5(c) show another recording waveform generated by the recording waveform generator 2. Specifically, when forming the high level of the NRZI data with the mark and the low level with the space, the recording waveform includes the recording pattern to record the mark having the length of 7T, the erase pattern to form the space having the length of 5T, and the recording pattern to record the mark having the length of 3T.

The recording pattern includes the pulse sequence. The erase pattern also includes the pulse sequence as shown in section G of FIG. 5(c). Tmp represents the width of the multi-pulse constituting the recording pattern. The multi-pulse represents at least one pulse where the width and the power strength are identical. According to an aspect of the present invention, Tmp is 0.5T. Tlp represents the width of the last pulse constituting the recording pattern. Tcl represents the time for which the cooling pulse lasts. The cooling pulse ranges over the recording pattern and the erase pattern. Temp represents the width of the erase multi-pulse constituting the erase pattern. According to an aspect of the present invention, Temp is 0.5T. Tsfp represents the time from a point when the NRZI data is switched from the low level to the high level to a point when the first pulse constituting the recording pattern starts. Tsfp affects the power level of the erase pattern. In other words, as shown, if Tsfp is greater than 0.5T, the multi-pulse included in the erase pattern is ended at the low level $P_{b1}$ and subsequent Tsfp starts at the high level $P_{b2}$. In contrast, if Tsfp is smaller than 0.5T, the multi-pulse included in the erase pattern is ended at the low level $P_{b1}$ and subsequent Tsfp maintains the low level $P_{b1}$ of the multi-pulse.

Figure 6:
FIGS. 6(a) through 6(e) are views of waveforms explaining four types of erase patterns, according to an aspect of the present invention.
Figure 6:
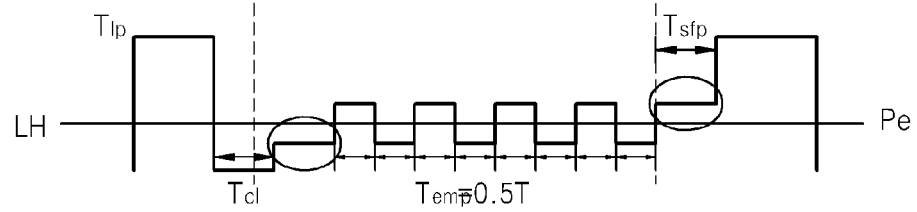
Figure 6:
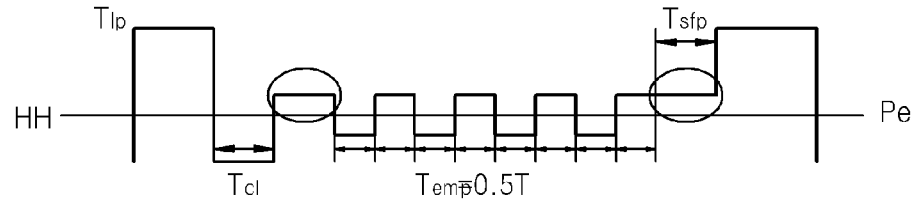
Figure 6:
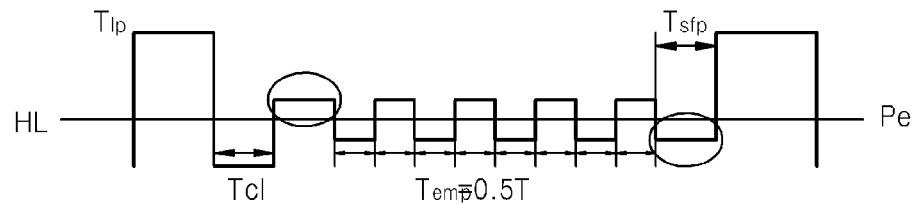
Figure 6:
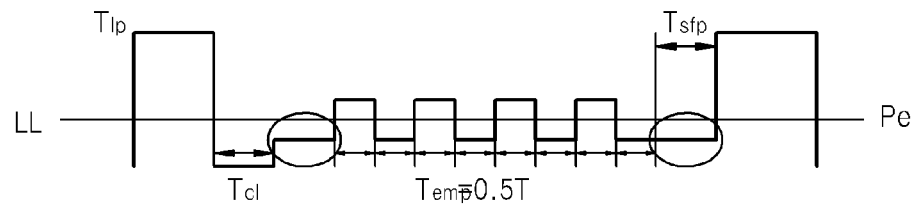

FIGS. 6(a) through 6(e) are views of waveforms to explain four types of erase patterns, according to an aspect of the present invention. An erase pattern according to the present invention is classified into four types: FIG. 6(b) shows LH, FIG. 6(c) shows HH, FIG. 6(d) shows HL, and FIG. 6(e) shows LL. Each erase pattern is marked with a circle for easy identification of the differences. In FIG. 6(b), LH represents the power of the first pulse constituting the erase pattern being equal to the low level $P_{b1}$ of the subsequent erase multi-pulse, the last erase multi-pulse constituting the erase pattern is ended at the low level $P_{b1}$, and the level of the subsequent Tsfp is equal to the high level $P_{b2}$ of the erase multi-pulse. In FIG. 6(c), HH represents the power of the first pulse constituting the erase pattern being equal to the high level $P_{b2}$ of the subsequent erase multi-pulse, the last erase multi-pulse constituting the erase pattern is ended at the high level $P_{b2}$, and the level of the subsequent Tsfp is maintained at the high level $P_{b2}$ of the erase multi-pulse. In FIG. 6(d), HL represents the power of the first pulse constituting the erase pattern being equal to the high level $P_{b2}$ of the subsequent erase multi-pulse, the last erase multi-pulse constituting the erase pattern is ended at the high level $P_{b2}$, and the level of the subsequent Tsfp is equal to the low level $P_{b1}$ of the erase multi-pulse. Finally, in FIG. 6(e), LL represents the power of the first pulse constituting the erase pattern being equal to the low level $P_{b1}$ of the subsequent erase multi-pulse, the last erase multi-pulse constituting the erase pattern is ended at the low level $P_{b1}$, and the level of the subsequent Tsfp is maintained at the low level $P_{b1}$ of the erase multi-pulse.

In examples of the recording waveforms shown in FIGS. 4A(a) through 6(e), the level of Tlp of the last pulse of the recording waveform is equal to the high level of the recording pulse, but may have any intermediate level value of level values between the high level of the recording pulse and the high level of the erase pulse.

Figure 7:
FIGS. 7(a) through 7(d) are views of examples of an LH shown in FIG. 6.
Figure 7:
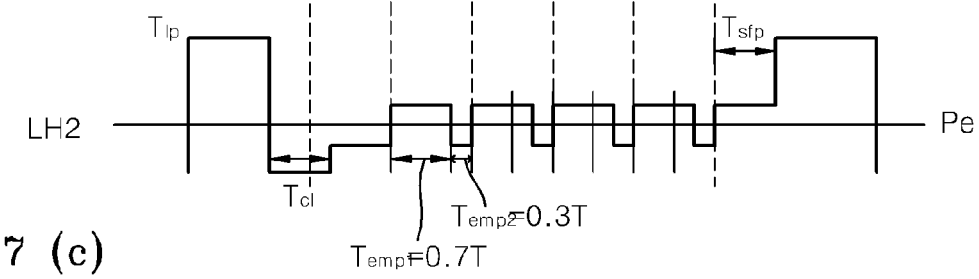
Figure 7:
Figure 7:
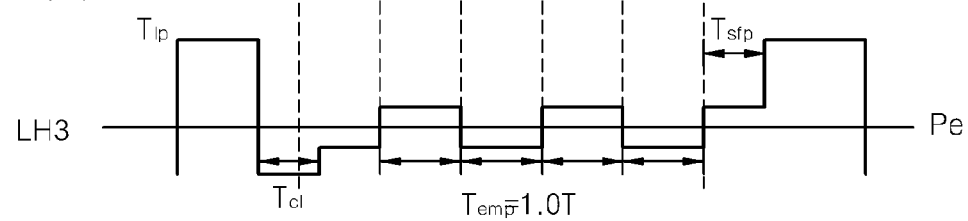

FIGS. 7(a) through 7(d) show other examples of LH shown in FIG. 6(b). Referring to FIGS. 7(a) and 7(b), LH2 is identical to LH of FIG. 6(b), except that the time Temp1, for which the high level $P_{b2}$ of the erase multi-pulse constituting one period lasts, and the time Temp2, for which the low level $P_{b1}$ lasts, are 0.7T and 0.3T, respectively. FIGS. 7(c) and 7(d) illustrate LH3, which is also identical to LH of FIG. 6(b) except that the time Temp, for which the high level $P_{b2}$ lasts and for which the low level $P_{b1}$ of an erase multi-pulse lasts, is 1.0T. Here, a ratio of the time Temp1, for which the high level $P_{b2}$ of the erase multi-pulse constituting one period lasts, to the time Temp2 for which the low level $P_{b1}$ lasts, is m:n (m and n are integers). A value of the ratio may vary.

The recording waveform, according to an aspect of the present invention, has the erase pattern including the erase multi-pulse with the low and high levels $P_{b1}$ and $P_{b2}$ so as to reduce distortion of the trailing edge of the mark and improve the reproduction characteristic of the mark. In particular, the recording waveforms previously described are formed by controlling the times for which the low level $P_{b1}$ and the high level $P_{b2}$ of the erase multi-pulse last, i.e., the "lasting times," to be within a range of 0.25-0.75T of the clock period T to select a lasting time suitable for thermal characteristics of the disc 200. Thus, the recording waveforms greatly reduce distortion of the trailing edge of the mark and improve the reproduction characteristic of the mark.

Information about four types of erase patterns (information about type or erase pulse levels $P_{b1}$ and $P_{b2}$) may be recorded in a lead-in region of the recordable disc or may be included as header information in a wobble signal. Thus, when recording the data, the recording apparatus reads information about the type or the level of the erase pulse from the lead-in region or the wobble signal to generate a corresponding recording waveform so as to form the mark and the space.

Four types of erase patterns may be used as signs to represent the speed factor of the disc or the kinds of marks when recording/reproducing data. For example, the signs may indicate "a disc using an LH type erase pattern has a speed factor of 20."

To obtain optimized recording/reproducing conditions for four types of erase patterns, level values of the erase pulse are recorded in and reproduced from a predetermined test area of the disc within a predetermined range (e.g., a range of ±20%) in each predetermined unit (e.g., a unit of 3-4% of the erase pulse level). A corresponding recording waveform is generated from these results to form the mark and the space. Here, there are several methods of determining optimized recording conditions: measuring jitter to select the conditions under which the jitter value becomes minimum; measuring a bit error rate to select a condition where a bit error rate becomes minimum; deducing a condition where the resolution (a value obtained by dividing an amplitude value of the shortest signal by an amplitude value of the longest signal) is maximum; measuring modulation (a value obtained by dividing a high level value of the longest signal by a low level value of the longest signal) to determine the recording condition where the modulation is maximum; and measuring asymmetry to determine the recording condition within a predetermined standard. In the test method, a random pattern or a predetermined pattern may be used.

To ascertain effects of aspects of the present invention, shapes of marks recorded through simulation are observed. A structure used in the simulation is shown in Table 1. A used disc has a four-layer structure.

TABLE 1

|  | Substrate | Dielectric layer | Recording layer | Dielectric layer | Reflective layer |
| --- | --- | --- | --- | --- | --- |
| Material | PC | ZnS—SiO$_2$ | Sb—Te eutectic | ZnS—SiO$_2$ | Ag alloy |
| Thickness | 0.6 mm | 128 nm | 14 nm | 16 nm | 30 nm |

Figure 8:
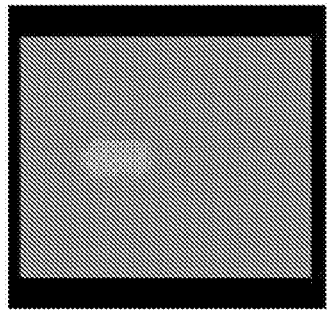
FIGS. 8(a) through 8(c), 9(a) through 9(c), and 10(a) through 10(c) are views of shapes of marks recorded through simulation.
Figure 8:
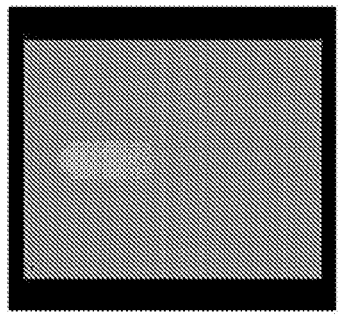
Figure 8:
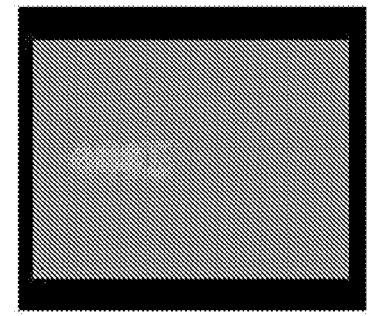
Figure 9:
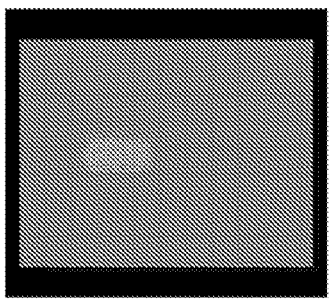
Figure 9:
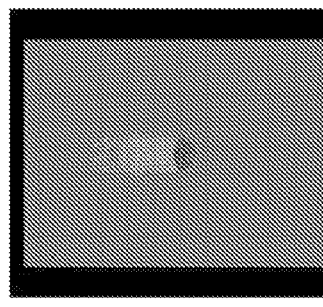
Figure 9:
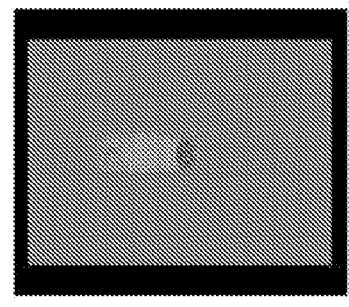
Figure 10:
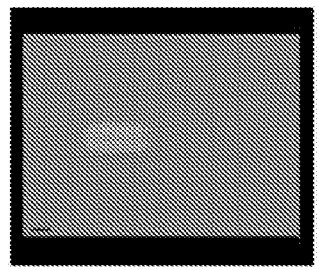
Figure 10:
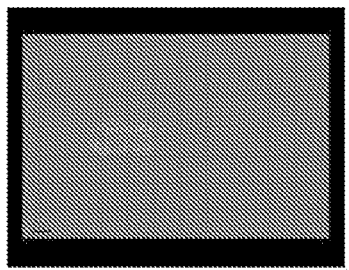
Figure 10:
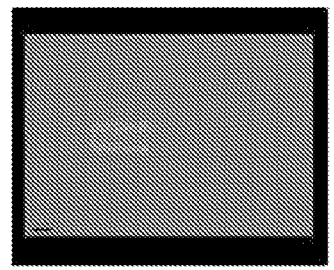
Figure 11:
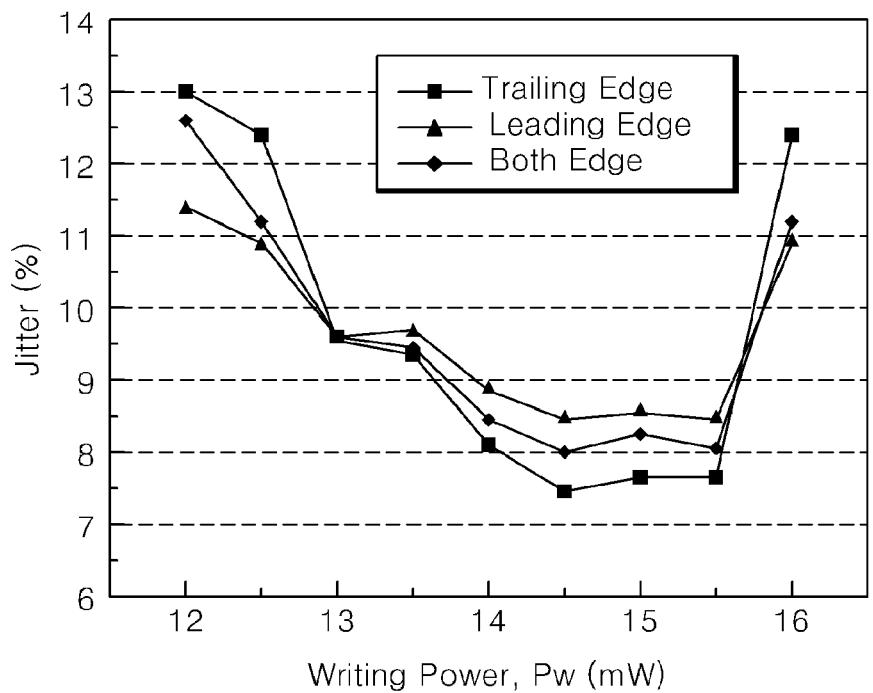
Figure 11:
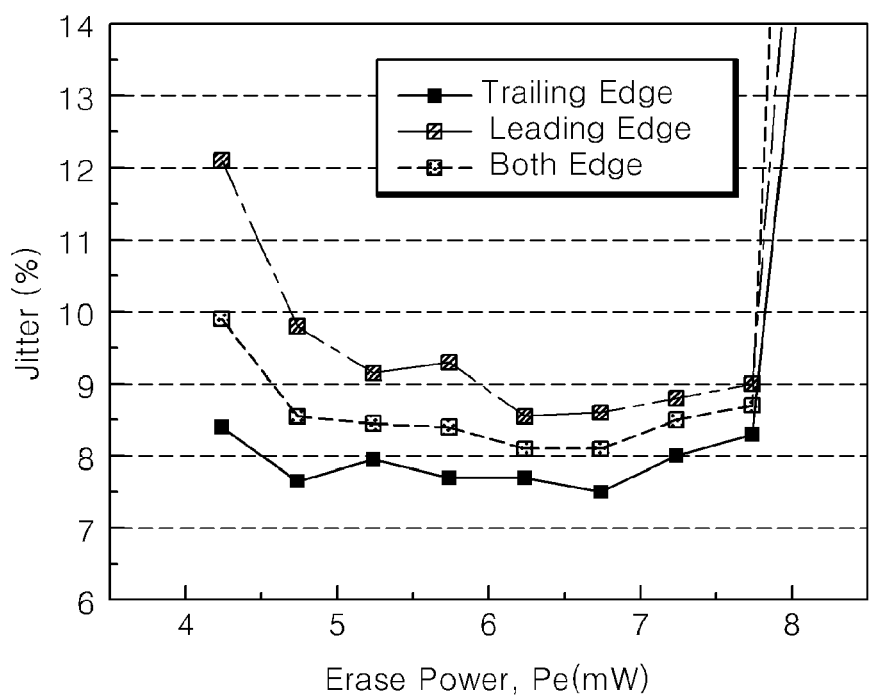
Figure 12:
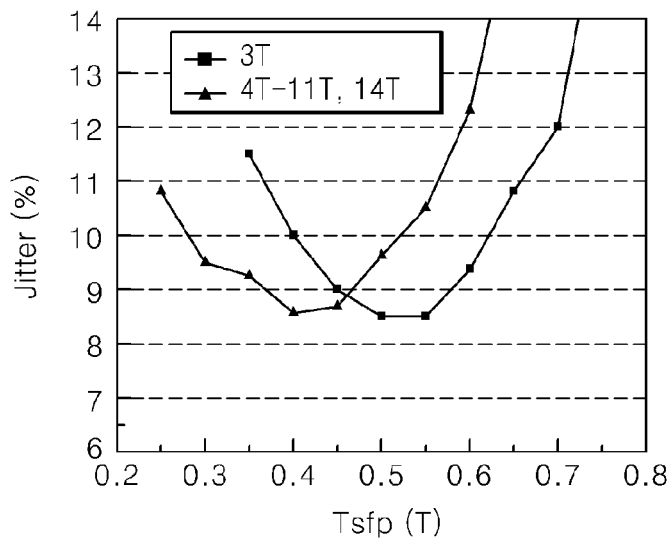
Figure 12:
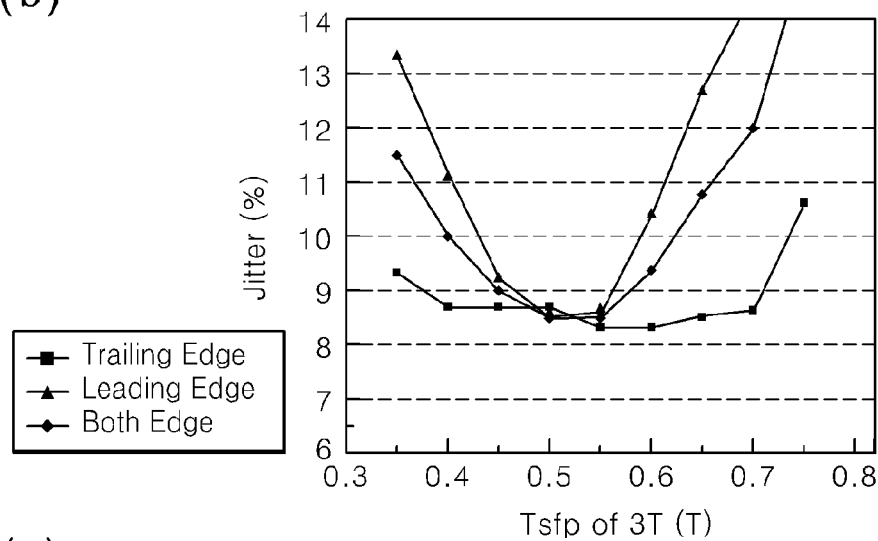
Figure 12:
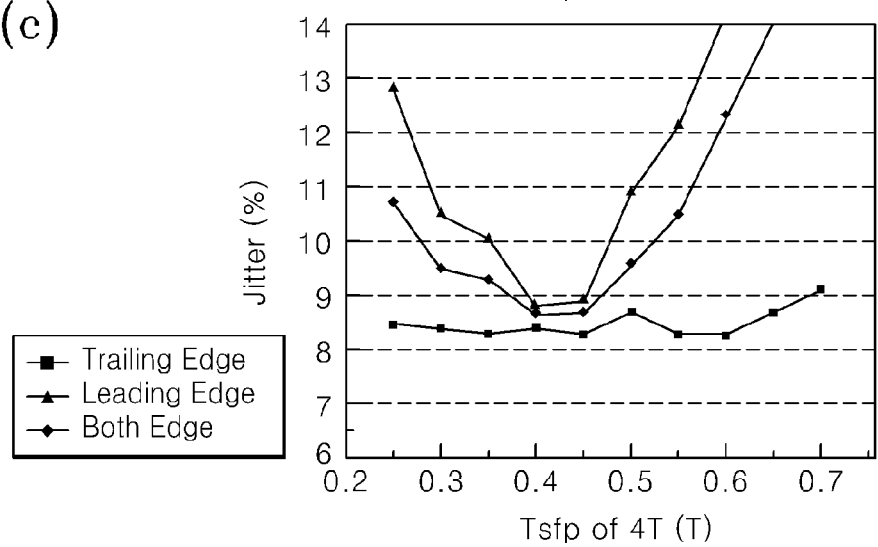
Figure 13:
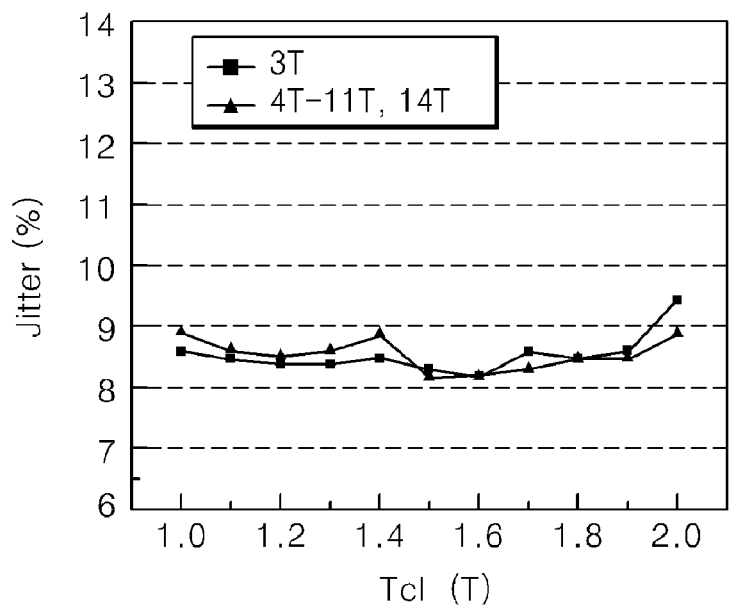
Figure 13:
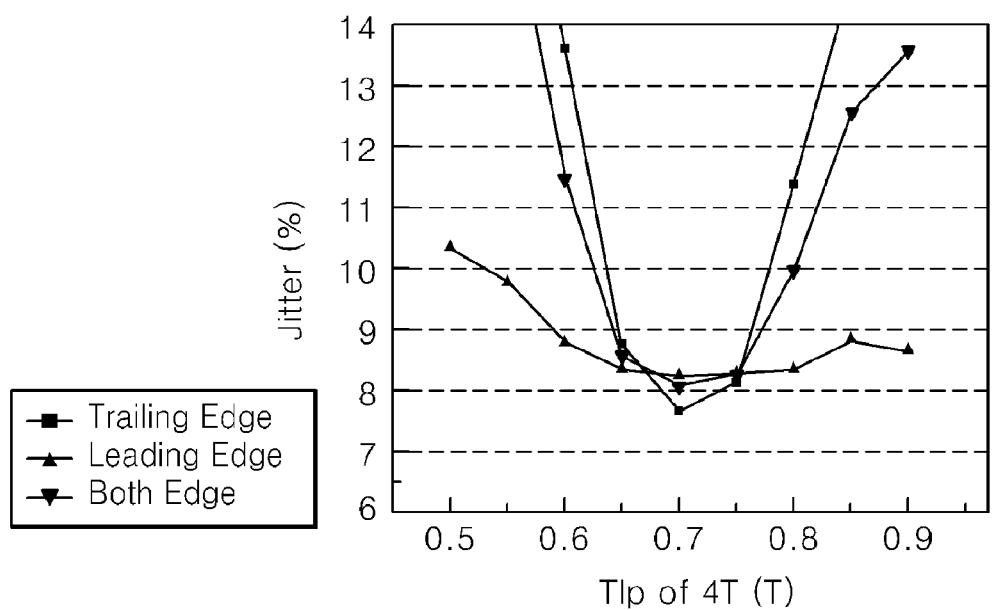
Figure 14:
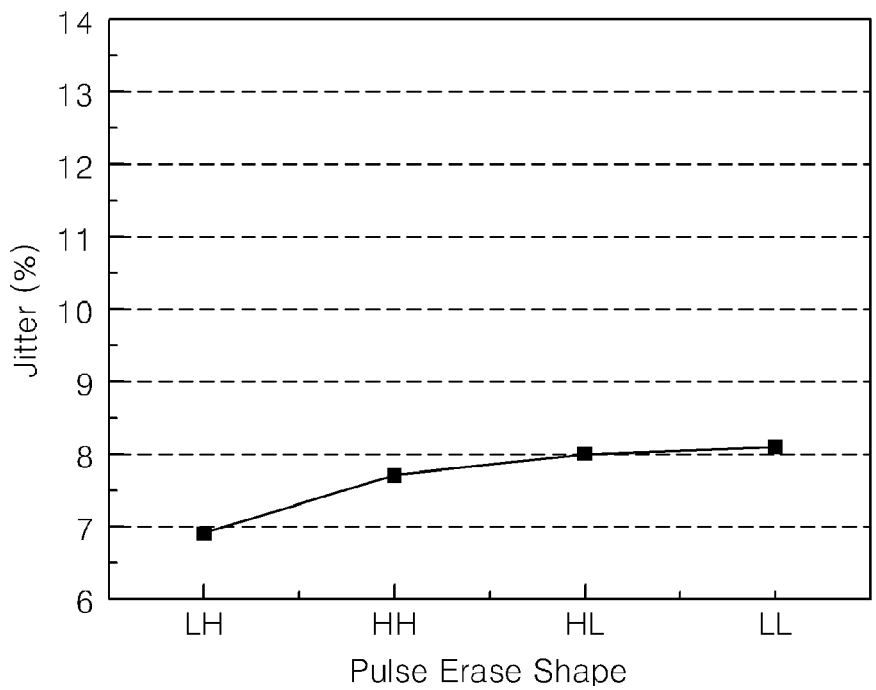
Figure 14:
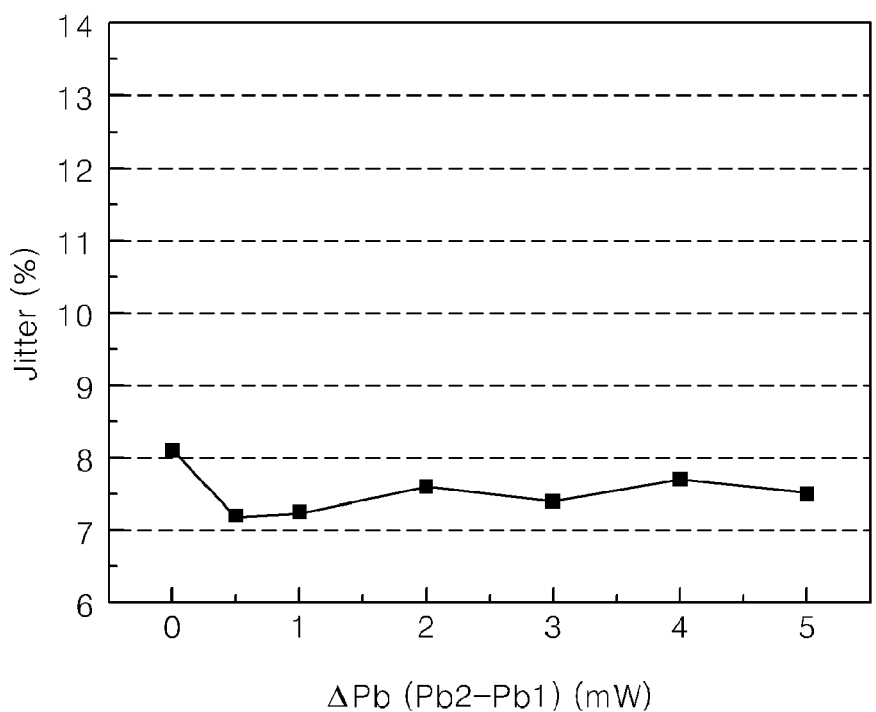

The simulation is performed under conditions of a wavelength of 405 nm, a numerical aperture NA of 0.65, and a linear velocity of 6 m/s. To observe the shapes of the marks, a first mark having a length of 8T is recorded and then a second mark having a length of 8T is recorded so as to overlap 4T of the first mark. FIGS. 8(a) through 8(c), 9(a) through 9(c), and 10(a) through 10(c) show the results of comparing marks when using a conventional recording waveform and marks when using the recording waveform according to an aspect of the present invention. FIG. 8(a) is a mark formed through simulation, FIG. 8(b) is the mark formed by a recording waveform, according to an aspect of the present invention. FIG. 8(c) is the mark formed by the recording waveform according to the conventional recording waveform. FIG. 9(a) is the mark formed through simulation, FIG. 9(b) is the mark formed by the recording waveform having the erase pattern, according to an aspect of the present invention, and FIG. 9(c) is the mark formed by the recording waveform having a DC erase pattern according to the conventional recording waveform. FIG. 10(a) is the mark formed through simulation, FIG. 10(b) illustrates the mark of FIG. 10(a) erased by the erase pattern, according to an aspect of the present invention, and FIG. 10(c) represents the mark of FIG. 10(a) erased by the DC erase pattern, according to the conventional recording waveform.

Table 2 shows the parameters of a thin film used for simulation for thermal analysis.

TABLE 2

| Material | $\lambda = 405$ nm | | C | k |
| --- | --- | --- | --- | --- |
| | n | k | (J/cm$^3$ · K) | (W/cm · K) |
| ZnS—SiO$_2$ | 2.300 | 0.000 | 2.055 | 0.0058 |
| Sb—Te eutectic (crystal) | 1.650 | 3.150 | 1.285 | 0.0060 |
| Sb—Te eutectic (amorphous) | 2.900 | 2.950 | 1.285 | 0.0060 |
| Ag alloy | 0.170 | 2.070 | 2.450 | 0.2000 |

Referring to the simulation results shown in FIGS. 8(a) through 8(c), 9(a) through 9(c), and 10(a) through 10(c), it can be seen that the trailing edge of the mark of FIG. 8(b) formed by the recording waveform having the erase pattern according to an aspect of the present invention, is similar in shape to the mark formed through the simulation than the trailing edge of the mark of FIG. 8(c) formed by the recording waveform having the DC erase pattern according to the conventional recording waveform. In FIGS. 9(a) through 9(c), it can be seen that the shape of the leading edge of the mark formed by the erase pattern according to an aspect of the present invention, is better than that of the leading edge of the mark according to the conventional recording waveform. From the simulation results, it could be ascertained that the shape of the mark, according to an aspect of the present invention, is improved by using the recording waveform having the erase pattern including the erase multi-pulse compared to the shape of a conventional mark. The shape, width, and power level of the erase multi-pulse can be controlled to further reduce the distortion of the shape of the mark.

To experimentally verify the effects of the present invention, parameters necessary to obtain the recording waveforms as shown in FIGS. 4(a) and 5(c), i.e., lasting time and power level, are obtained from 4.7 GB DVD-RAM and 4.7 GB DVD-RW discs using a DVD estimator having a wavelength of 650 nm and an NA of 0.60. Next, repeated recording/reproducing characteristics are compared with recording/reproducing characteristics obtained by an existing method.

FIGS. 11(a) through 15 are graphs showing the characteristics of the DVD-RAM. FIGS. 11(a) through 13(b) show recording characteristic data according to time changes of the power and Tsfp when erasing the mark from the DVD-RAM using the existing DC erase pattern. In FIGS. 11(a) through 13(b), power conditions used to test the DC erasing process are Pw=14.5 mW, $P_{b2}$=6.0 mW, $P_{b1}$=4.5 mW, and Pc=3.2 mW.

FIG. 11(a) and FIG. 11(b) show jitter characteristics according to a writing power Pw and an erase power Pe with respect to the leading edge, trailing edge, and both edges of the mark when erasing the mark using the existing DC erase pattern.

FIGS. 12(a) through 13(b) show results measured when erasing the mark using the existing DC erase pattern. Referring to FIGS. 12(a) through 12(c) and FIGS. 14(a) and 14(b), when Tsfp is 0.5T and 0.4T, respectively, with respect to the DC erase patterns of the NRZI data having lengths of above 3T and 4T, the jitter characteristics corresponding to the DC erase patterns are the best. When Tlp is 0.7T, the jitter characteristics are good, and the value of Tcl, a duration of a cooling pulse, is out of relation to the jitter characteristics.

The mark is formed using the recording waveform having the previously described four types of erase pattern based on obtained parameters and then the characteristics of the mark are measured. The measured results are as follows.

FIGS. 14(a) and 14(b) shows jitter characteristics of the four types of erase patterns shown in FIGS. 6(a) through 6(e). Referring to FIG. 14(a), it can be seen that of the four types, LH is the best. When measuring recording characteristics, according to the method of an aspect of the present invention, as shown in FIG. 14(a), power conditions of Pw=14.5 mW, $P_{b2}$=7.0 mW, $P_{b1}$=5.0 mW, and Pc=3.2 mW are obtained. Here, $\Delta Pb(P_{b2}-P_{b1})$=2.0 mW. Powers $P_{b1}$ and $P_{b2}$ have the following relationship with a recording condition Pe: $Pc \leq P_{b1} \leq Pe$, $Pe \leq P_{b2} \leq Pw$. Here, if $P_{b1}$ is much lower than Pe, the recording mark is not completely erased. If $P_{b2}$ is much higher than Pe, another recording mark is created when erasing the recording mark, which results in degradation of a reproduction signal. Thus, according to an aspect of the present invention, $P_{b1}$ is greater than 0.5*Pe with respect to Pe and $P_{b2}$ is smaller than 1.5*Pe with respect to Pe.

FIG. 14(b) shows jitter characteristics with respect to a difference $\Delta Pb(P_{b2}-P_{b1})$ between the high level and the low level of the erase multi-pulse when the mark is erased using the erase pattern including the erase multi-pulse. It can be seen that the jitter characteristics are hardly changed up to 5 mW.

Figure 15:
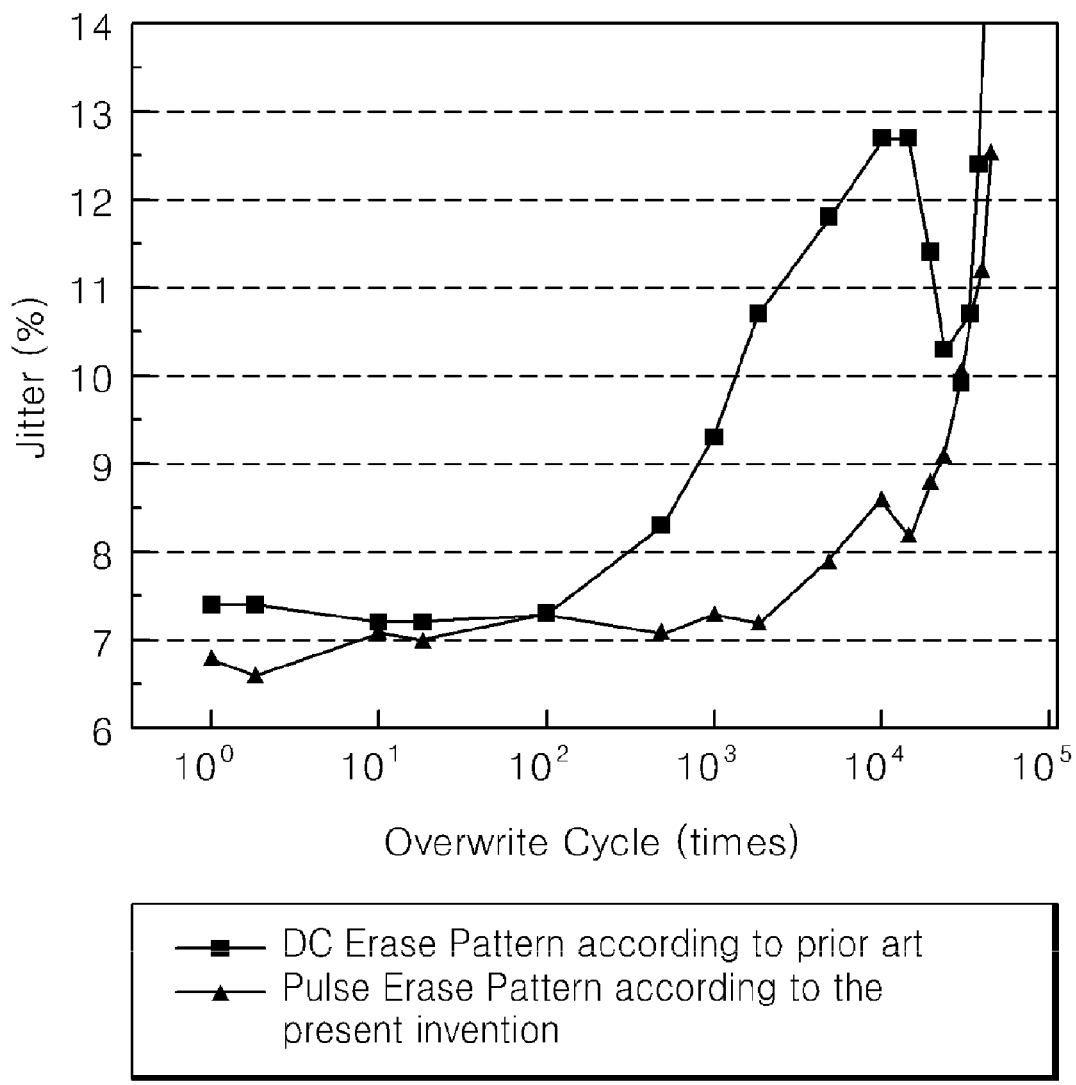
Figure 16:
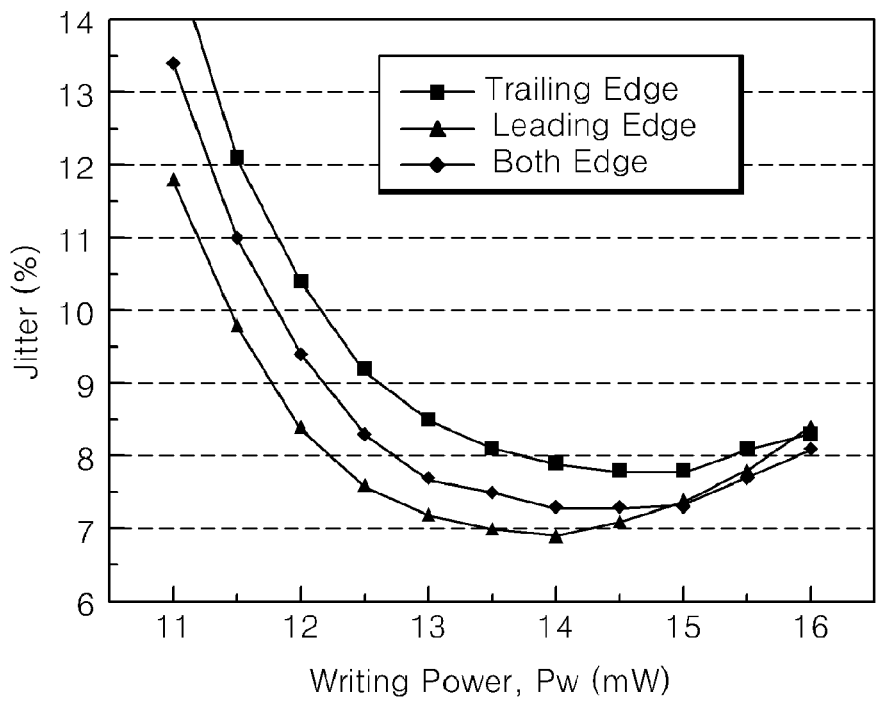
Figure 16:
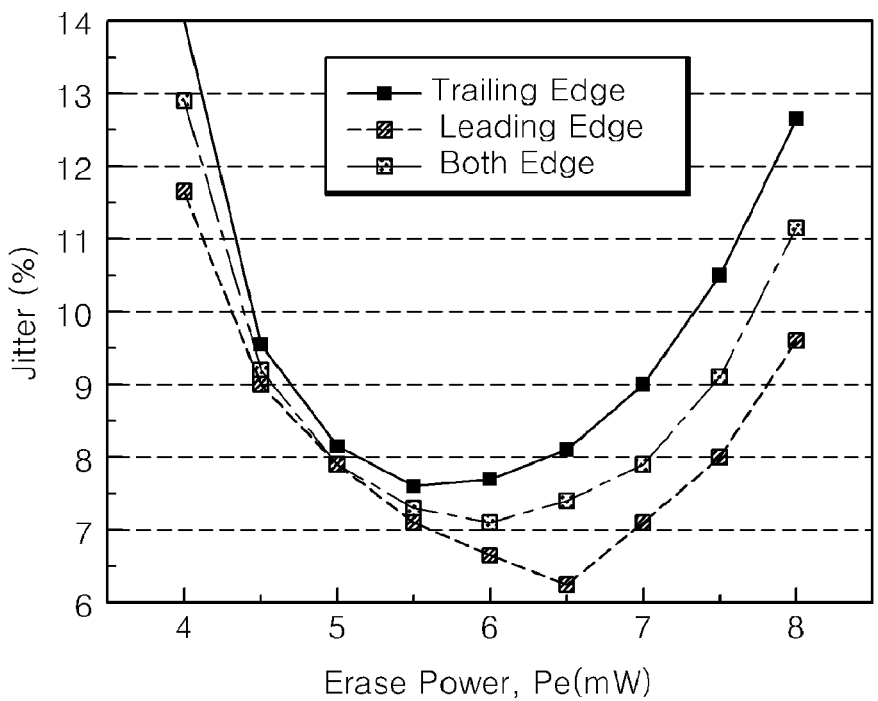
Figure 17:
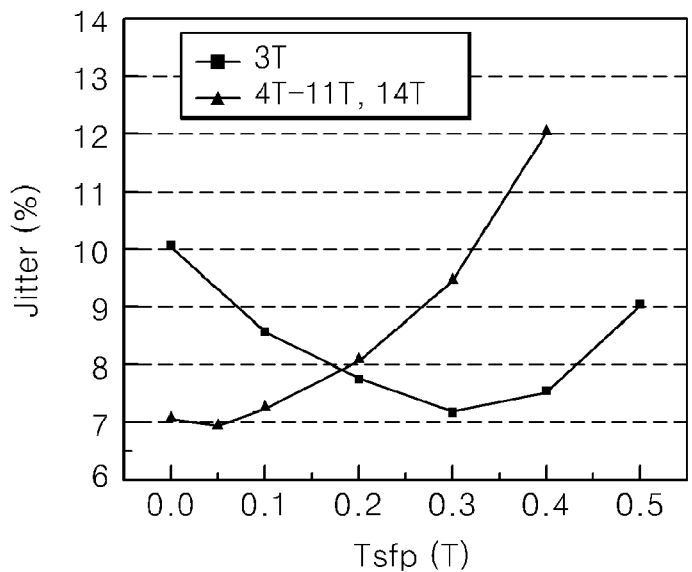
Figure 17:
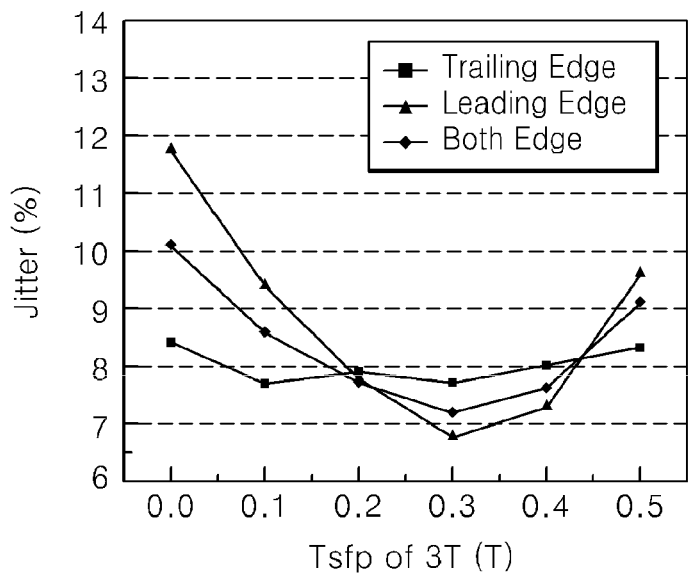
Figure 17:
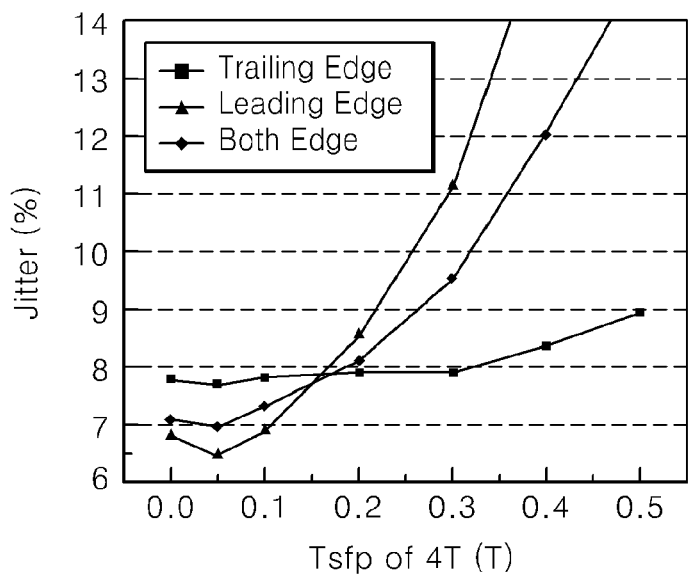
Figure 18:
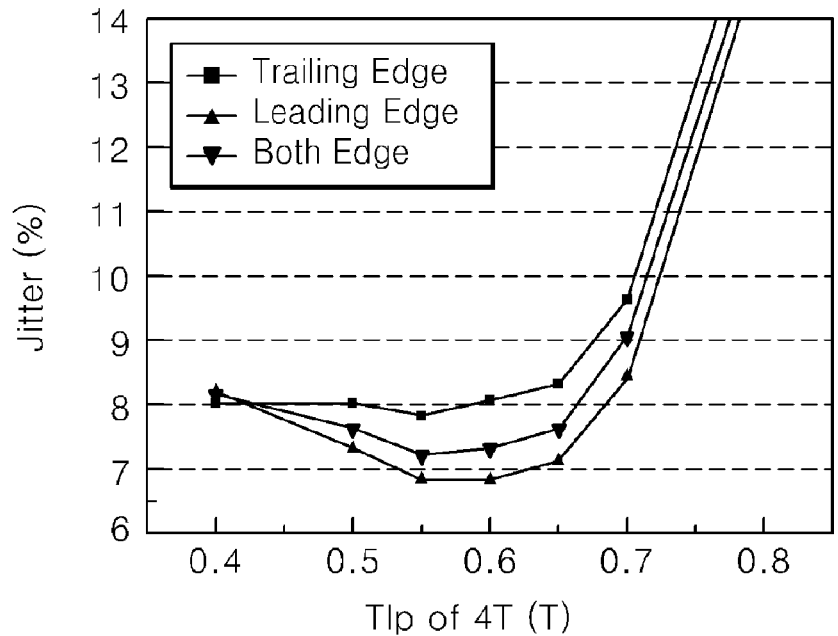
Figure 18:
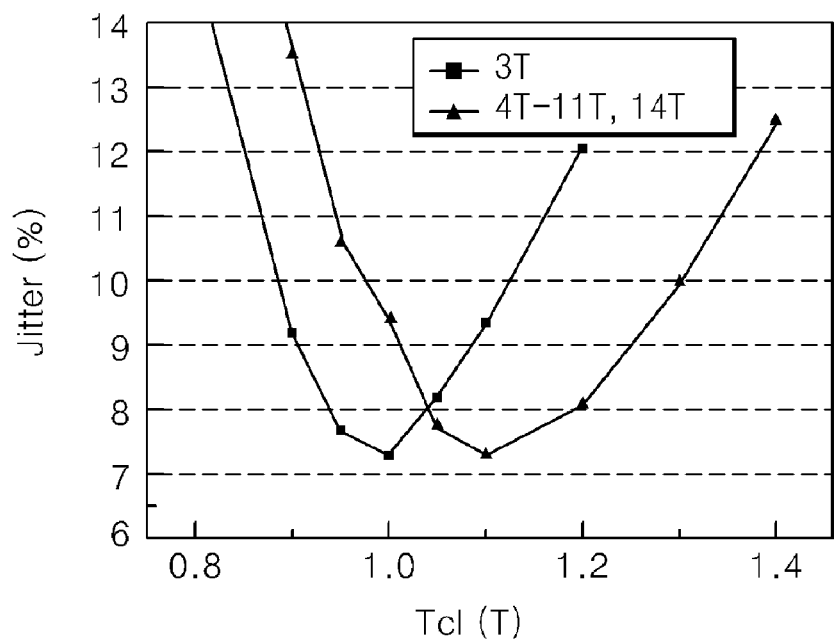
Figure 19:
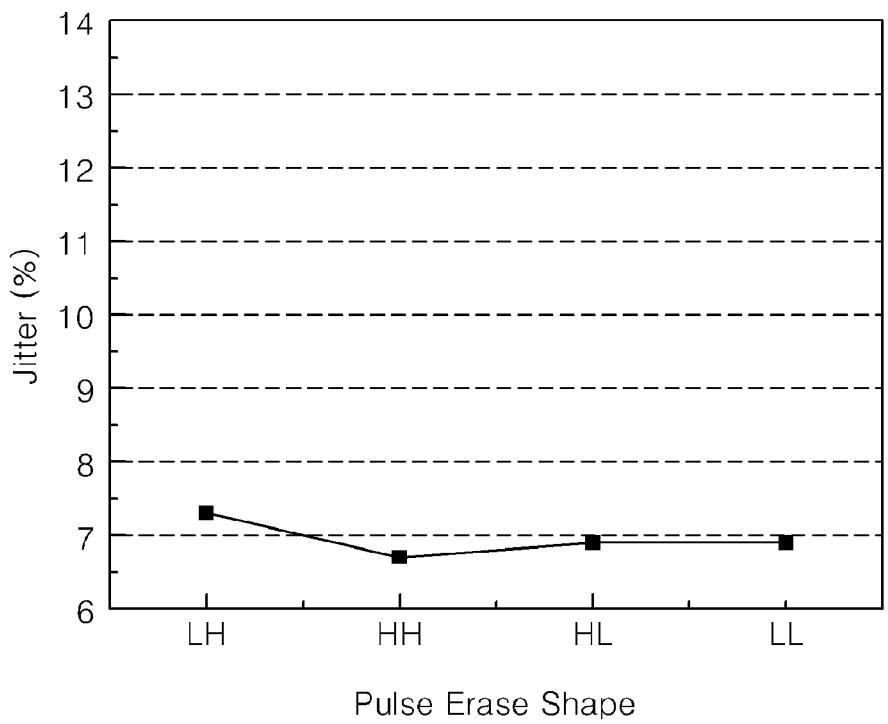
Figure 19:
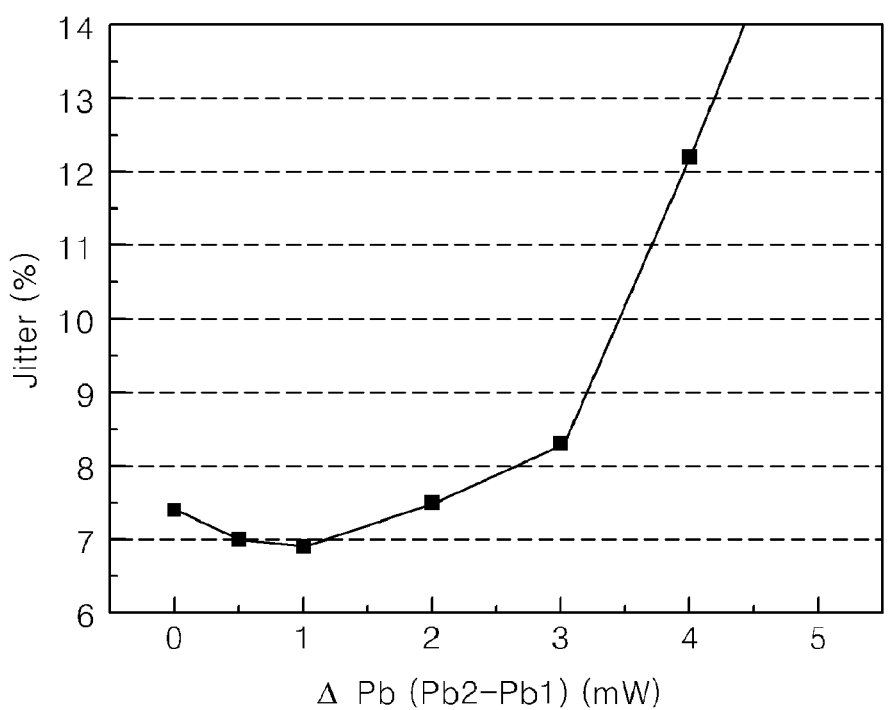

FIG. 15 shows jitter characteristics when repeatedly recording and reproducing marks using the recording pulse having the erase pattern, according to an aspect of the present invention. Referring to FIG. 15, because the marks are erased using the erase multi-pulse, repeated recording characteristics of the mark are good.

FIGS. 16(a) through 20 are graphs showing the characteristics of the DVD-RW.

FIGS. 16(a) through 18(b) show recording characteristic data according to time changes of the power and Tsfp when erasing the mark using the existing DC erase pattern from the DVD-RW disc. In FIGS. 16(a) through 18(b), it can be seen that the power conditions used as test data for the DC erasing process are Pw=14.0 mW, Pe=6.0 mW, and Pc=0.5 mW.

FIGS. 16(a) and 16(b) show jitter characteristics according to the writing power Pw and the erase power Pe with respect to the leading edge, the trailing edge, and both edges of the mark when erasing the mark using the existing DC erase pattern.

FIGS. 17(a) through 18(b) show results measured when erasing the mark using the existing DC erase pattern. Referring to FIGS. 17(a) through 18(b), Tsfp may be 0.3T and 0.05T with respect to the marks having lengths of above 3T and 4T, respectively. Tlp, which is the last pulse constituting the recording pattern, may be set at 0.55T and Tcl may be set at 1.0T or 1.1T.

The mark is formed using the recording waveform having the previously-described four types of erase patterns based on the obtained parameters and then the reproducing characteristics of the mark are measured. The measured results are as follows.

FIGS. 19(a) and 19(b) shows jitter characteristics of the four types of erase patterns shown in FIGS. 6(a) through 6(e). Referring to FIGS. 19(a) and 19(b), it can be seen that, of the four types, HH is the best. When measuring recording characteristics, according to the method of an aspect of the present invention, shown in FIGS. 19(a) and 19(b), power conditions of Pw=14.0 mW, $P_{b2}$=6.5 mW, $P_{b1}$=5.5 mW, and Pc=0.5 mW are obtained. Here, the difference between $P_{b1}$ and $P_{b2}$ is 1.0 mW, i.e., $\Delta Pb(P_{b2}-P_{b1})$=1.0 mW. The powers $P_{b1}$ and $P_{b2}$ have the following relationship with the recording condition Pe when erasing a mark with the DC erase pattern: $Pc \leq P_{b1} \leq Pe$, $Pe \leq P_{b2} \leq Pw$. If $P_{b1}$ is much lower than Pe, the recording mark is not completely erased. If $P_{b2}$ is much higher than Pe, another recording mark is created when erasing the recording mark, which results in the degradation of a reproduction signal. Thus, according to an aspect of the present invention, $P_{b1}$ is greater than 0.7*Pe with respect to Pe and $P_{b2}$ is smaller than 1.3*Pe with respect to Pe.

The jitter characteristics can be obtained with respect to the difference $\Delta Pb(P_{b2}-P_{b1})$ between the high level and the low level of the erase multi-pulse when erasing the mark using the erase pattern including the erase multi-pulse, according to an aspect of the present invention. Because the jitter characteristics are sharply degraded above 3 mW, a power of 1 mW is selected as the recording/reproducing condition.

Figure 20:
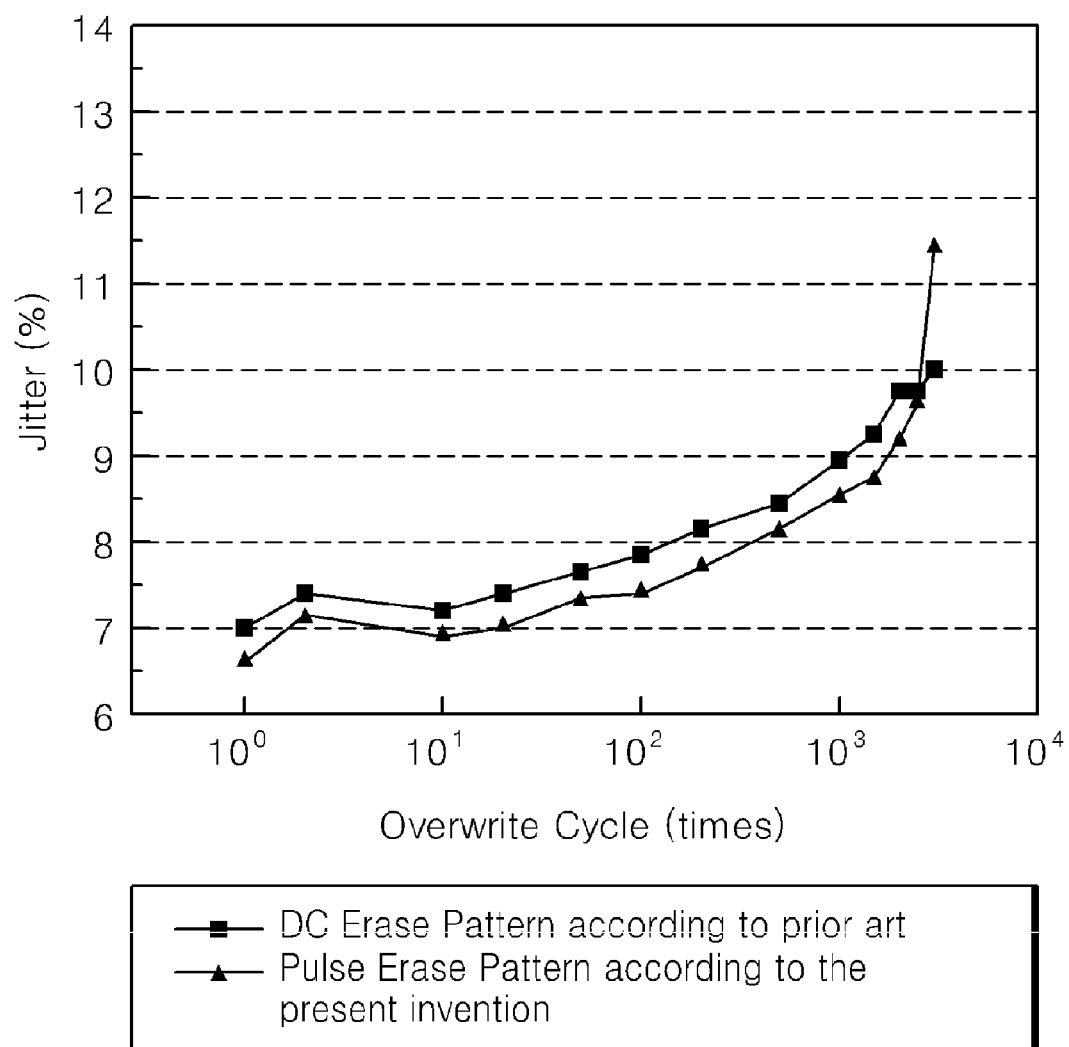

FIG. 20 shows jitter characteristics obtained when repeatedly recording/reproducing the mark using the recording pulse having the erase pattern, according to an aspect of the present invention. Referring to FIG. 20, it can be seen that because the mark is erased using the erase multi-pulse, the repeated recording characteristics of the mark are good. However, when the recording of the mark is repeated more than 2000 times, the jitter characteristics are sharply degraded. Thus, a pulse erase method, may be used, according to an aspect of the present invention, when the mark is repeatedly recorded 1000 times, which is guaranteed to happen in the DVD-RW disc.

The above experiments use the EFM+ modulation method of the DVD format. In a case where other modulation methods, which are generally used for stably recording the recording mark, e.g., RLL(1,7), D(8-15), dual modulation, and the like, are adopted therein and the same results can also be obtained.

Figure 21A:
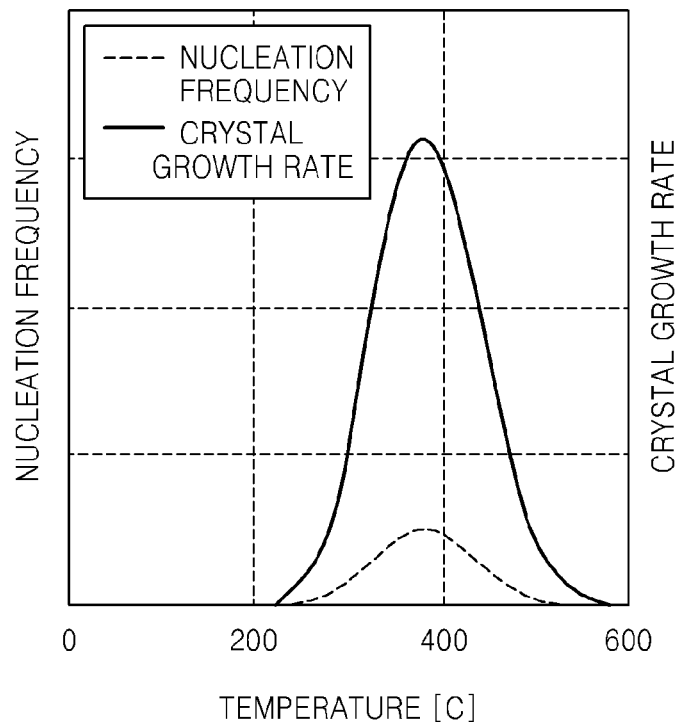
FIGS. 21A and 21B are graphs illustrating a nucleation and a crystal growth rate according to temperatures of an AgInSbTe recording layer and a GeSbTe recording layer, respectively.
Figure 21B:
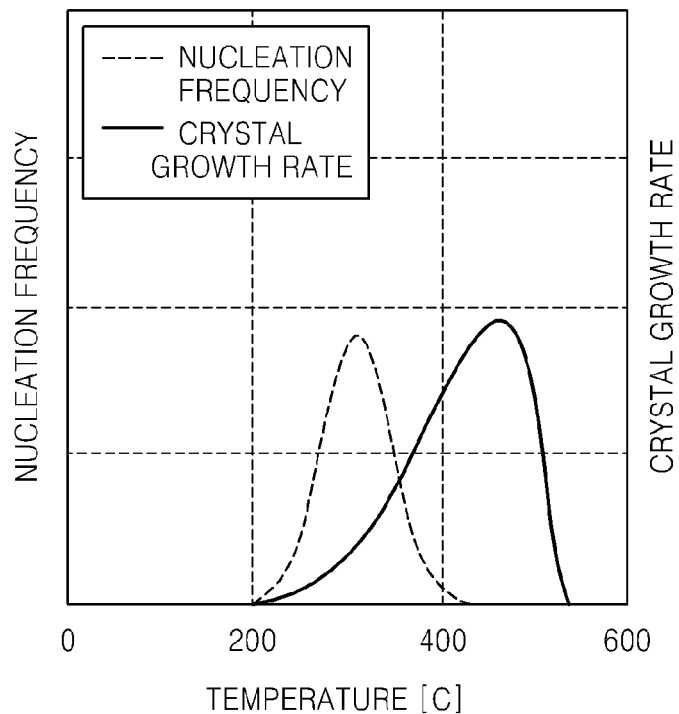

FIGS. 21A and 21B are graphs showing a nucleation frequency and a crystal growth rate according to temperatures of an AgInSbTe recording layer and a GeSbTe recording layer, respectively. As shown in FIGS. 4(a) through 7(d), in the present invention, the erase power $P_{b1}$ of the erase multi-pulse is smaller than the erase power Pe and the erase power $P_{b2}$ is greater than the erase power Pe. In other words, the erase powers are controlled according to the characteristics of the recording layers. Also, information about the erase powers $P_{b1}$ and $P_{b2}$ is recorded on the optical recording medium and a drive reads information about the erase powers $P_{b1}$ and $P_{b2}$. Thus, information about the erase powers $P_{b1}$ and $P_{b2}$ can be used as reference information to generate the erase pulses. In the case of the optical recording medium on which the erase power $P_{b1}$ or $P_{b2}$ is not recorded, information about the erase powers $P_{b1}$ and $P_{b2}$ can be input from the outside and used as reference information to generate the erase pulses.

Referring to FIG. 21A, temperatures of the crystal growth rate and the nucleation frequency are equal in the AgInSbTe recording layer which is mainly used in the DVD-RW. The temperature of a portion of the erase region in which erasing is ended becomes higher than the temperature of a portion of the erase region in which erasing starts due to thermal accumulation when erasing the mark with the DC erase power. As a result, the quality of the reproduction signal may be degraded. However, according to an aspect of the present invention, it is possible to set the pulse erase powers $P_{b1}$ and $P_{b2}$ where the crystal growth is maximum. Here, the temperatures of the portion of the erase region where erasing starts and the portion of the erase region where erasing ends can be maintained to be almost identical. Thus, the recording mark is uniformly erased, which reduces noise so as to improve the quality of the reproduction signal.

Referring to FIG. 21B, in the GeSbTe recording layer which is mainly used in the DVD-RAM, the temperature of a crystal growth rate is higher than the temperature of a nucleation frequency. Thus, after the nucleation is achieved by the pulse erase, crystal growth rate becomes higher when the existing mark is overwritten by Pe having a high temperature and a high level $P_{b2}$. As a result, the erasing (crystallization) is not performed well. Thus, the characteristics of the leading and trailing edges of the recording mark are improved when recording the recording mark by the pulse erase method of an aspect of the present invention. Also, the recording mark is uniformly erased, which reduces noise so as to improve the quality of the reproduction signal.

A recording method according to an aspect of the present invention will be described based on the above-described structure.

Figure 22A:
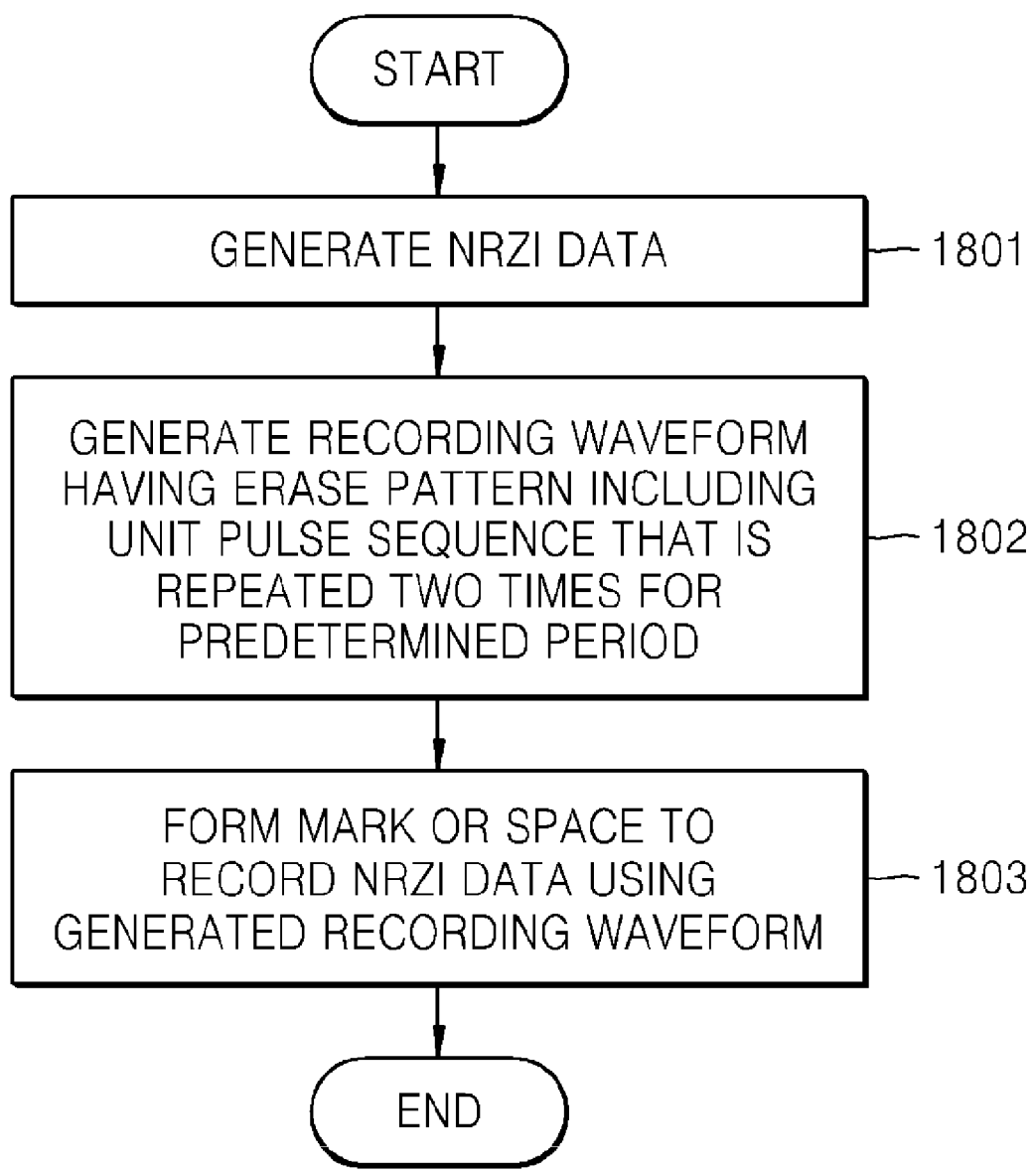

FIGS. 22A and 22B are flowcharts explaining the recording method, according to an aspect of the present invention. Referring to FIG. 22A, at operation 1801, the recording apparatus receives data from the outside, modulates the data, and generates the NRZI data. At operation 1802, a recording waveform having the erase pattern containing the erase multi-pulse is generated. At operation 1803, the mark or the space is formed on the disc 200 using the generated recording waveform.

Referring to FIG. 22B, at operation 2201, the recording apparatus receives data from the outside source, modulates the data, generates the NRZI data, and obtains the information about the erase powers $P_{b1}$ and $P_{b2}$ in step 2201. At operation 2202, the recording waveform having the erase pattern is generated based on the information about the erase powers $P_{b1}$ and $P_{b2}$. At operation 2203, the mark or the space is formed on the disc 200 using the generated recording waveform.

As described above, in a method and apparatus to record data, according to an aspect of the present invention, a recording waveform can prevent a shape of a mark from being distorted due to thermal interference and thermal accumulation between adjacent marks when recording the marks and improve a shape of the mark. As a result, recording/reproducing characteristics of the mark can be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to record NRZI data on an optical recording medium, the apparatus comprising:
   a recording waveform generator to generate a recording waveform having an erase pattern comprising a multi-pulse having a first level and a second level, wherein a power level of a period between a point where the NRZI data changes from a low level to a high level and a start point of a first pulse of a recording pattern is set to the first level of the multi-pulse or the second level of the multi-pulse, based on pulse information stored on the optical recording medium; and
   a pickup unit to radiate a light onto the optical recording medium according to the generated recording waveform to form a mark or a space;
   wherein the pulse information stored on the optical recording medium comprises power level information regarding the power level of the period between the point where the NRZI data changes from the low level to the high level and the start point of the first pulse of the recording pattern.

2. The apparatus of claim 1, wherein the period between the point where the NRZI data changes from the low level to the high level and the start point of the first pulse of the recording pattern has a non-zero time width.

3. The apparatus of claim 1, wherein the recording waveform generated by the recording waveform generator has a cooling pulse having a level lower than a lowest one of the first level of the multi-pulse and the second level of the multi-pulse and comprising a first cooling pulse portion forming a last portion of another recording pattern preceding the erase pattern, and a second cooling pulse portion forming a first portion of the erase pattern preceding a leading pulse of the multi-pulse of the erase pattern.

4. The apparatus of claim 1, wherein:
   the pulse information stored on the optical recording medium further comprises power level information regarding a power level of a leading pulse of the multi-pulse of the erase pattern; and
   the power level of the leading pulse of the multi-pulse of the erase pattern is set to the first level of the multi-pulse or the second level of the multi-pulse, based on the pulse information stored on the optical recording medium.

* * * * *